US010775764B2

(12) United States Patent
Shizuku et al.

(10) Patent No.: US 10,775,764 B2
(45) Date of Patent: Sep. 15, 2020

(54) CONTROL METHOD, WORKING SYSTEM, AND MANUFACTURING METHOD

(71) Applicant: Hirata Corporation, Kumamoto-shi, Kumamoto-ken (JP)

(72) Inventors: Hitoshi Shizuku, Kumamoto (JP); Nobuyuki Ono, Kumamoto (JP)

(73) Assignee: HIRATA CORPORATION, Kumamoto-Shi, Kumamoto-Ken (JP)

( * ) Notice: Subject to any disclaimer, the term of this patent is extended or adjusted under 35 U.S.C. 154(b) by 787 days.

(21) Appl. No.: 15/442,983

(22) Filed: Feb. 27, 2017

(65) Prior Publication Data

US 2017/0255182 A1    Sep. 7, 2017

(30) Foreign Application Priority Data

Mar. 2, 2016   (JP) .................................. 2016-040413

(51) Int. Cl.
*G05B 19/402* (2006.01)
*G05B 19/418* (2006.01)
(Continued)

(52) U.S. Cl.
CPC ........... *G05B 19/402* (2013.01); *B29D 30/00* (2013.01); *B29D 30/0016* (2013.01);
(Continued)

(58) Field of Classification Search
None
See application file for complete search history.

(56) References Cited

U.S. PATENT DOCUMENTS

| 7,024,183 B2 | 4/2006 | Hymel |
| 7,330,731 B2 | 2/2008 | Hymel |
| (Continued) | | |

FOREIGN PATENT DOCUMENTS

| CN | 1823537 A | 8/2006 |
| CN | 1913469 A | 2/2007 |
| (Continued) | | |

OTHER PUBLICATIONS

Office Action (Notice of Non-Final Rejection) dated Nov. 21, 2018, by the Korean Patent Office in corresponding Korean Patent Application No. 10-2017-0024309 and partial English translation of the Office Action. (13 pages).
(Continued)

*Primary Examiner* — Daxin Wu
(74) *Attorney, Agent, or Firm* — Buchanan Ingersoll & Rooney PC

(57) ABSTRACT

A working system includes at least one movable apparatus movable and at least one stationary apparatus. The movable apparatus includes a working unit performing a predetermined work. The stationary apparatus includes a control unit performing drive control of the working unit. A control method of the system includes: instructing, when the movable apparatus has reached a working position, the control unit of the stationary apparatus to establish communication with the working unit of the movable apparatus; updating status information indicating a communication establishment status, after the communication instruction; instructing the control unit to transmit an operation signal to the working unit in the working position; instructing the control unit to disconnect the communication, after the signal transmission instruction step; and updating the status information after the disconnection instruction.

10 Claims, 16 Drawing Sheets

(51) Int. Cl.
  *B29D 30/00* (2006.01)
  *B29D 30/20* (2006.01)
  *B29D 30/26* (2006.01)
  *G06F 8/65* (2018.01)

(52) U.S. Cl.
  CPC ............. *B29D 30/20* (2013.01); *B29D 30/26* (2013.01); *G05B 19/4189* (2013.01); *G05B 19/41815* (2013.01); *G06F 8/65* (2013.01); *B29D 2030/0038* (2013.01); *B29D 2030/208* (2013.01); *G05B 2219/25064* (2013.01); *G05B 2219/40405* (2013.01); *Y02P 90/08* (2015.11); *Y02P 90/28* (2015.11)

(56) References Cited

U.S. PATENT DOCUMENTS

| | | | | |
|---|---|---|---|---|
| 8,356,968 | B2* | 1/2013 | Shah | G05B 19/41815 414/805 |
| 9,937,543 | B2* | 4/2018 | Patzelt | B65H 75/242 |
| 2002/0084762 | A1* | 7/2002 | Kurokawa | G05B 19/19 318/560 |
| 2002/0198618 | A1* | 12/2002 | Madden | B62D 65/02 700/101 |
| 2003/0208893 | A1* | 11/2003 | Kilibarda | B23K 37/0443 29/407.01 |
| 2005/0026600 | A1* | 2/2005 | Hymel | H04M 1/274575 455/417 |
| 2011/0002694 | A1 | 1/2011 | Maejima et al. | |
| 2011/0107810 | A1* | 5/2011 | Kipping | B21C 47/02 72/371 |
| 2011/0198436 | A1* | 8/2011 | Liu | B60F 3/0007 244/19 |
| 2013/0150043 | A1* | 6/2013 | Park | H04W 16/32 455/436 |
| 2014/0097859 | A1* | 4/2014 | Matsumura | G01R 31/67 324/750.01 |
| 2014/0352381 | A1* | 12/2014 | Suzuki | B21D 43/025 72/4 |
| 2015/0025714 | A1* | 1/2015 | Beer | G05B 19/4189 701/19 |
| 2015/0115514 | A1* | 4/2015 | Ogawa | B23Q 3/08 269/57 |
| 2016/0114983 | A1* | 4/2016 | Vierbergen | G05B 19/4189 198/810.03 |
| 2016/0259319 | A1* | 9/2016 | Haga | G05B 19/402 |
| 2016/0291572 | A1* | 10/2016 | Kato | G05B 11/01 |
| 2017/0199510 | A1* | 7/2017 | Fujita | G05B 13/041 |
| 2019/0031218 | A1* | 1/2019 | Hamada | B61B 1/02 |

FOREIGN PATENT DOCUMENTS

| | | |
|---|---|---|
| EP | 1 649 703 B1 | 1/2016 |
| JP | 04-014437 B1 | 1/1992 |
| JP | 07-191746 A | 7/1995 |
| JP | 2003-251708 | 9/2003 |
| JP | 2004-310472 A | 11/2004 |
| JP | 2008-036714 A | 2/2008 |
| JP | 2010-219736 A | 9/2010 |
| JP | 4979084 B2 | 7/2012 |
| WO | 01/89818 A1 | 11/2001 |
| WO | 2005/013048 A2 | 2/2005 |
| WO | 2009/101830 A1 | 8/2009 |

OTHER PUBLICATIONS

Extended European Search Report dated Aug. 23, 2017, issued by the European Patent Office in corresponding European Application No. 17000316.4. (12 pages).

Office Action dated Jan. 3, 2019, by the Chinese Patent Office in corresponding Chinese Patent Application No. 201710109767.1. (5 pages).

\* cited by examiner

FIG. 5

Table 21a:

| CONNECTED SERVO IDENTIFICATION INFORMATION | SERVO LINK GROUP INFORMATION | COMMUNICATION ESTABLISHMENT STATUS | PRESENT VALUE INFORMATION | STATIONARY APPARATUS ID | CONNECTED UNIT ID | OPERATION INFORMATION |
|---|---|---|---|---|---|---|
| 1 | A | CONNECTED | ... | A01 | K01 | ... |
| 2 | A | CONNECTED | ... |  | C01 | ... |
| 3 | A | UNCONNECTED | ... |  | C02 | ... |
| ... | ... | ... | ... |  | ... | ... |

Table 31a:

| CONNECTED SERVO IDENTIFICATION INFORMATION | SERVO LINK GROUP INFORMATION | COMMUNICATION ESTABLISHMENT STATUS | PRESENT POSITION INFORMATION | MOVABLE APPARATUS ID | WORKING POSITION INFORMATION |
|---|---|---|---|---|---|
| 1 | B | CONNECTED | ... | B01 | ... |
| ... | ... | ... | ... |  | ... |

FIG. 8
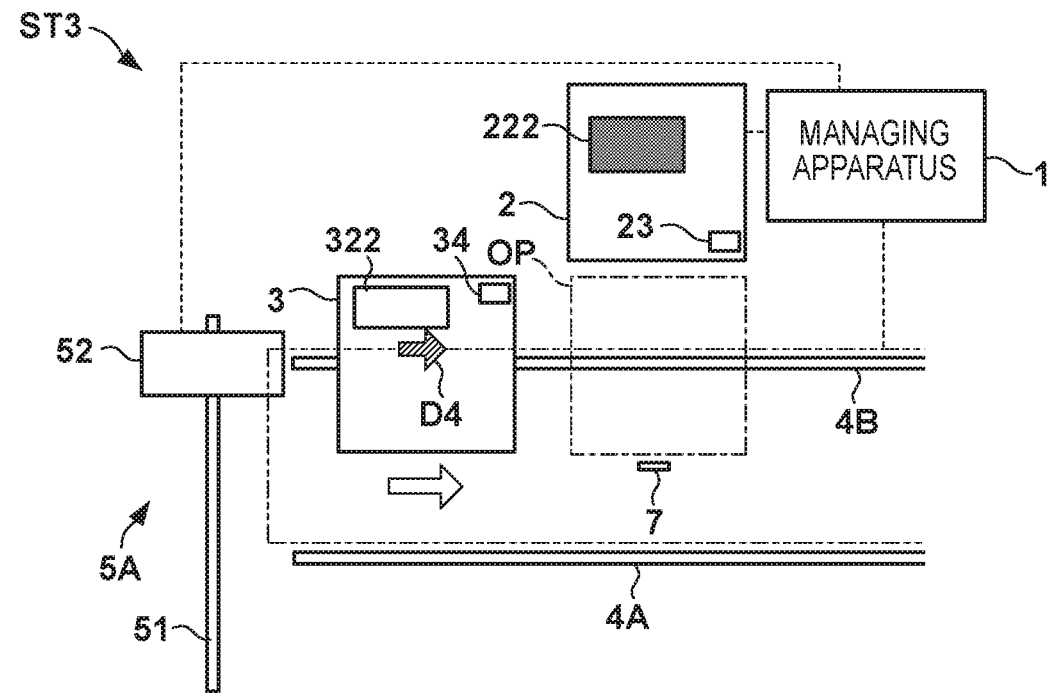
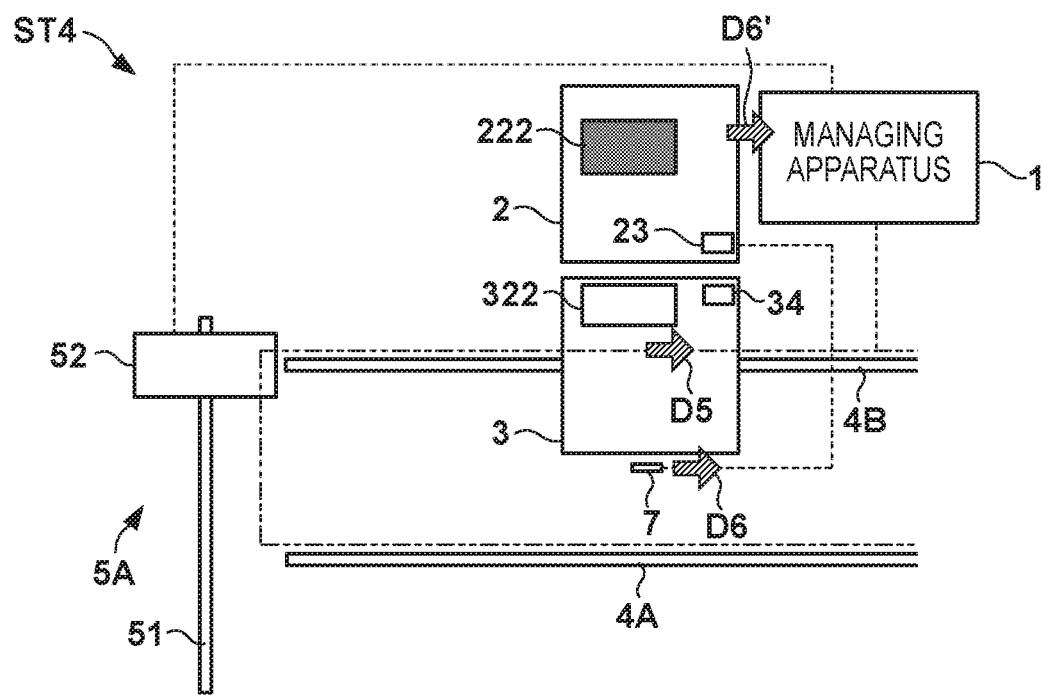

FIG. 9
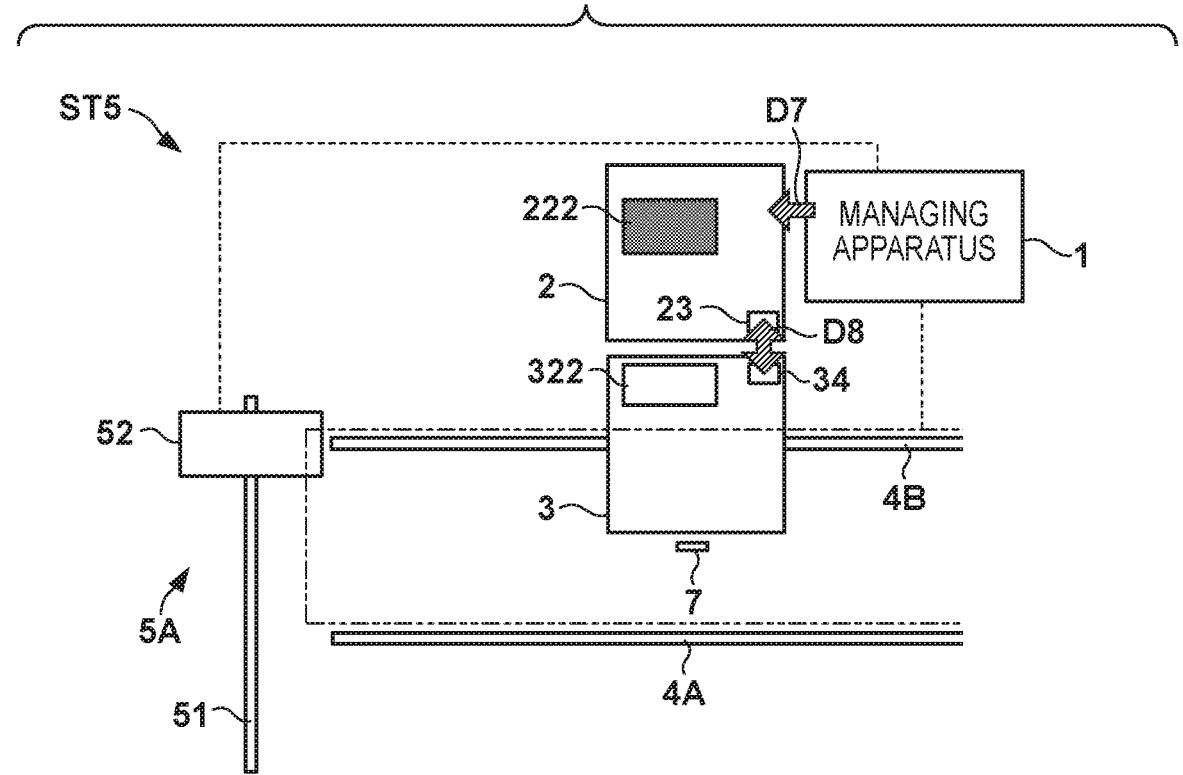
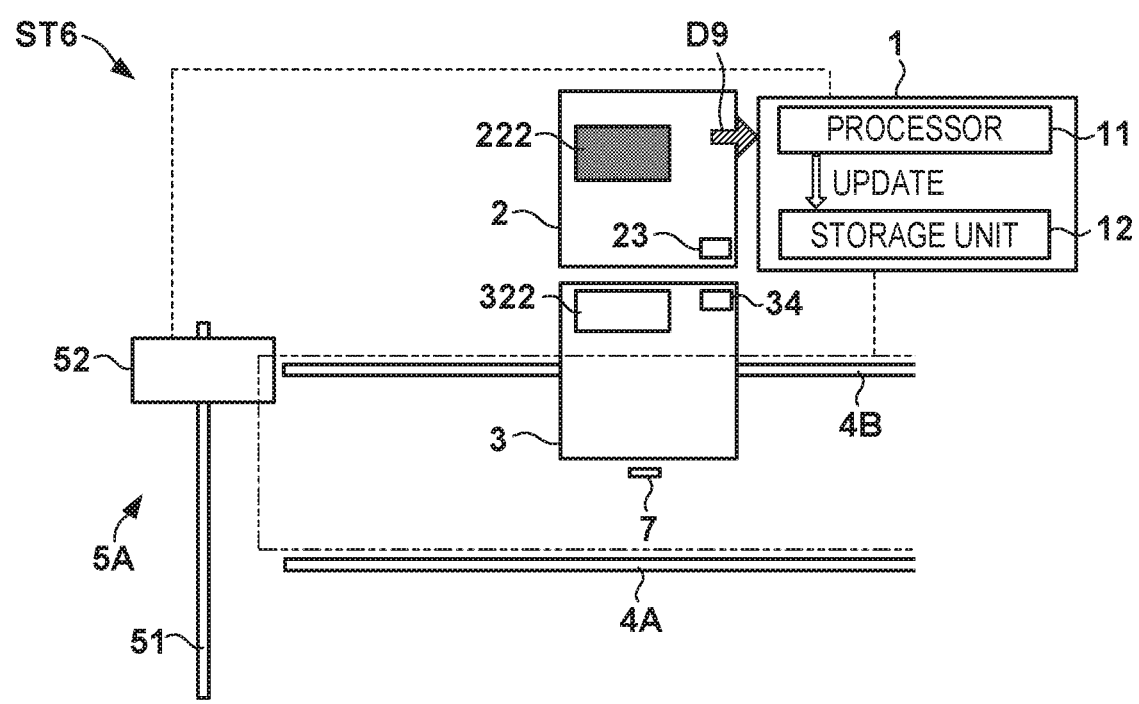

FIG. 10
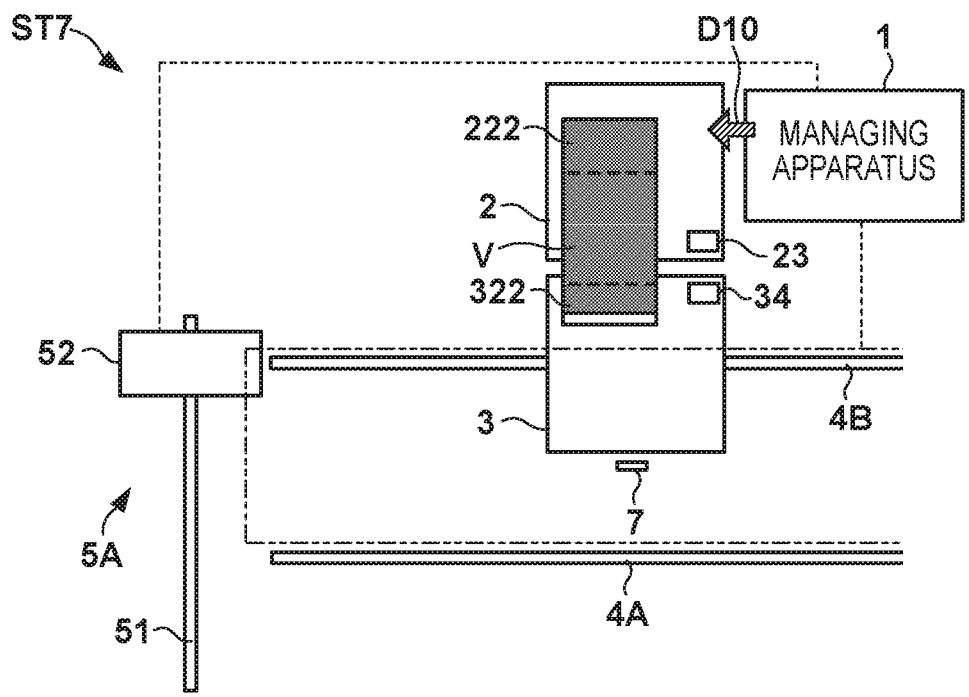
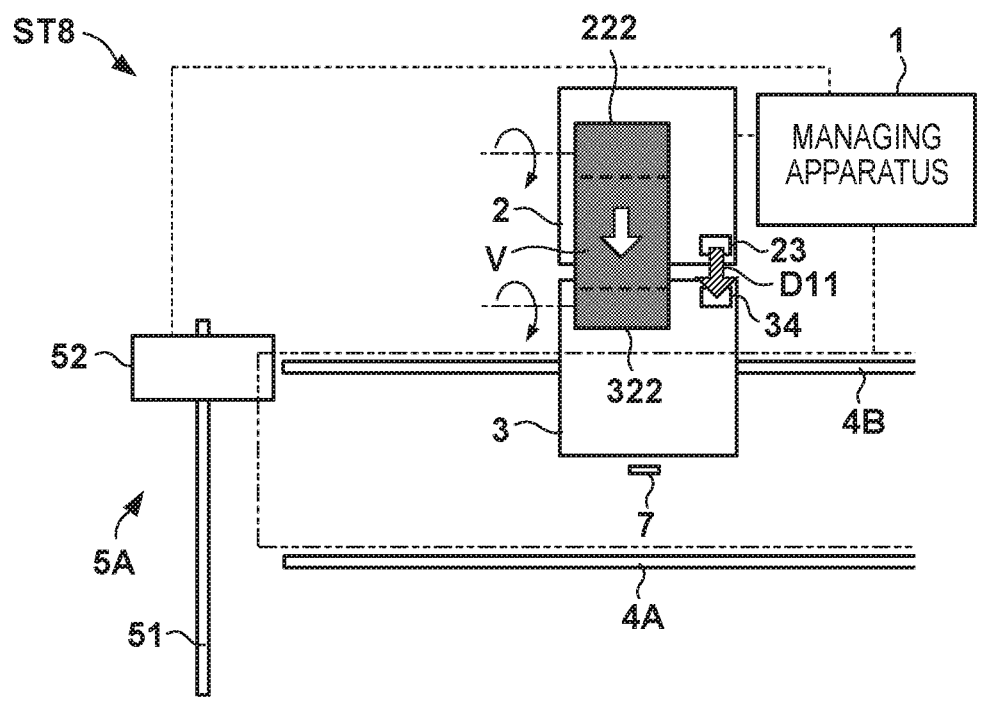

FIG. 11
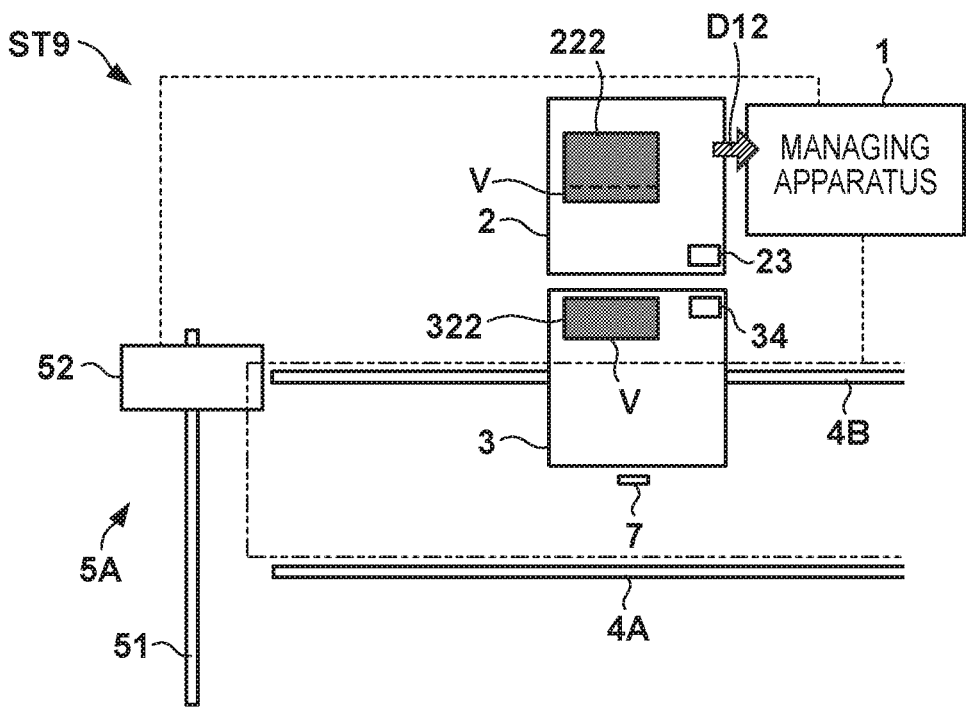
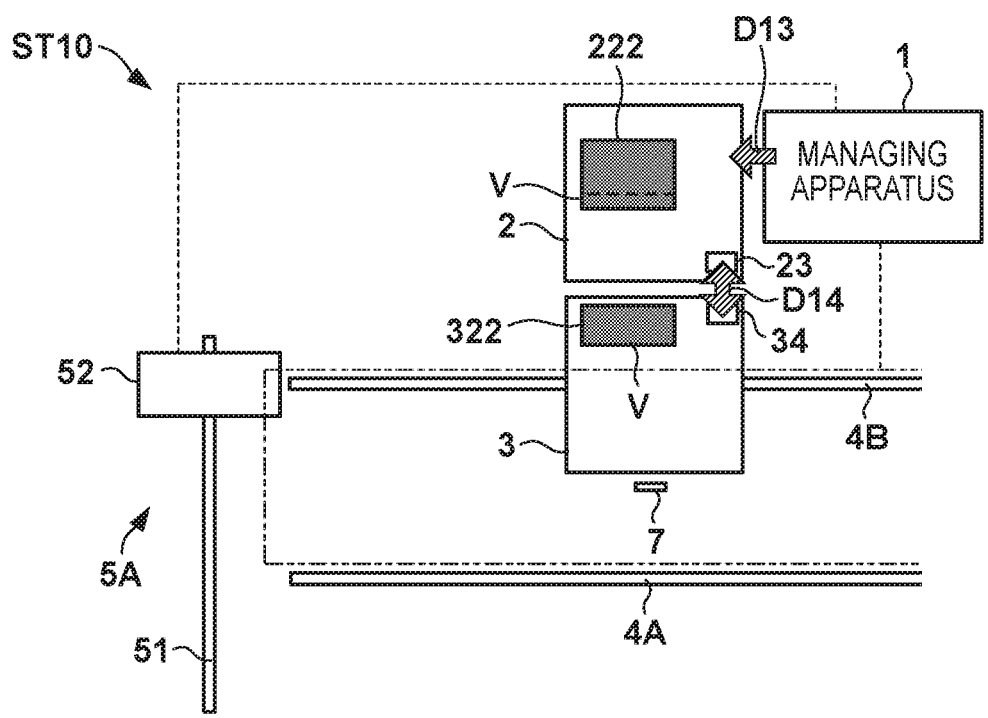

FIG. 12
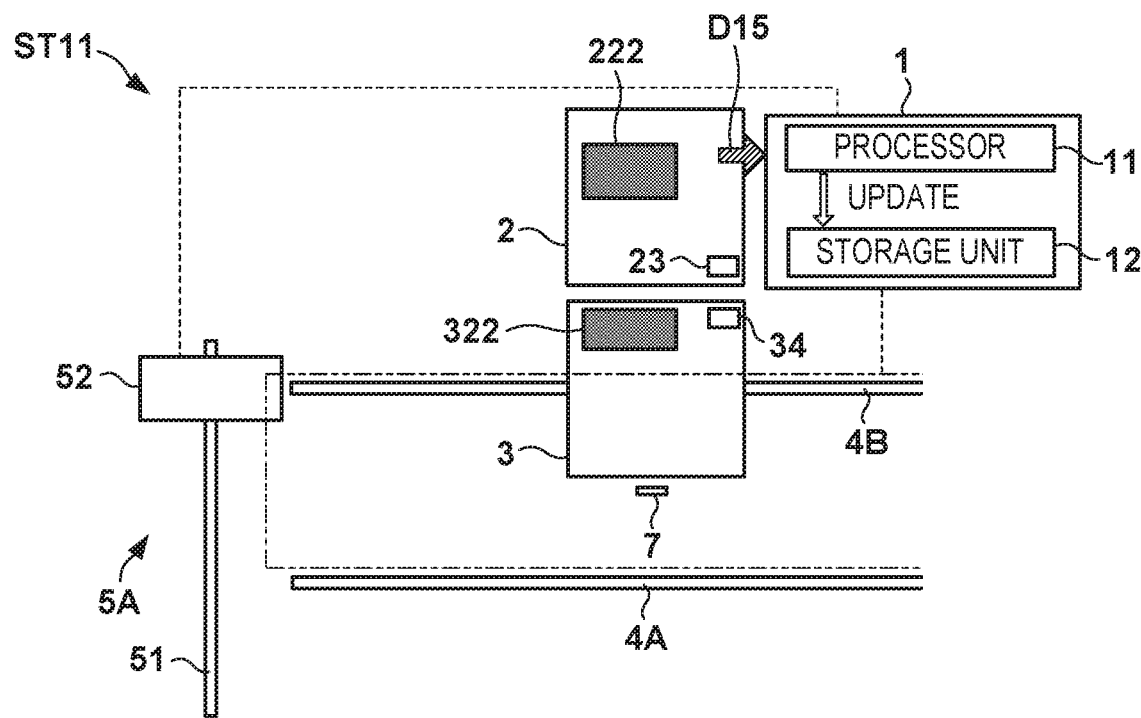
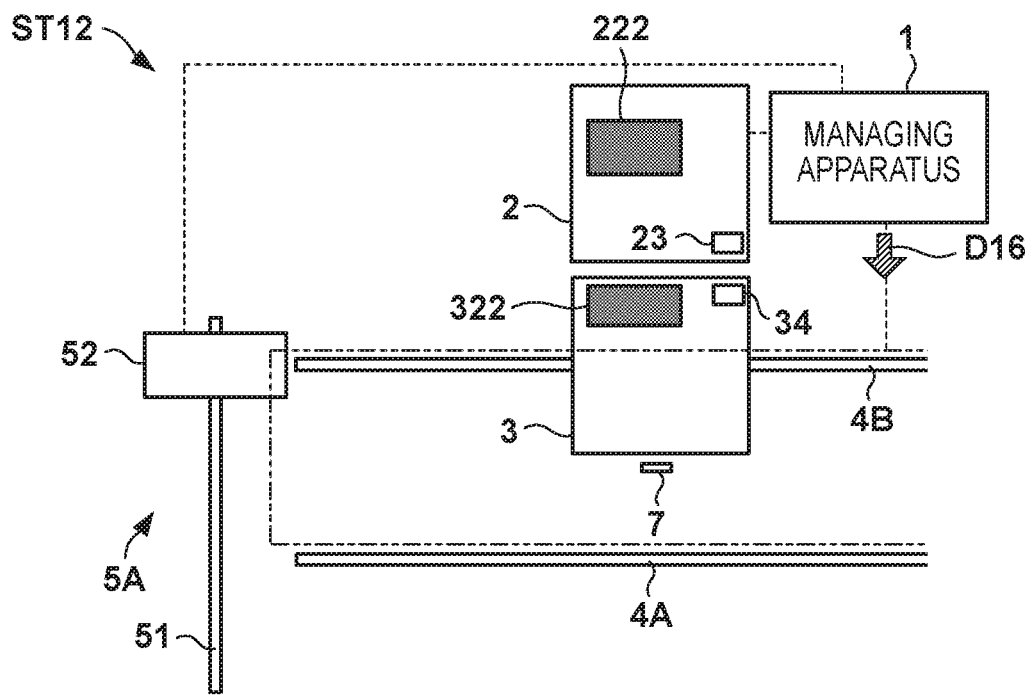

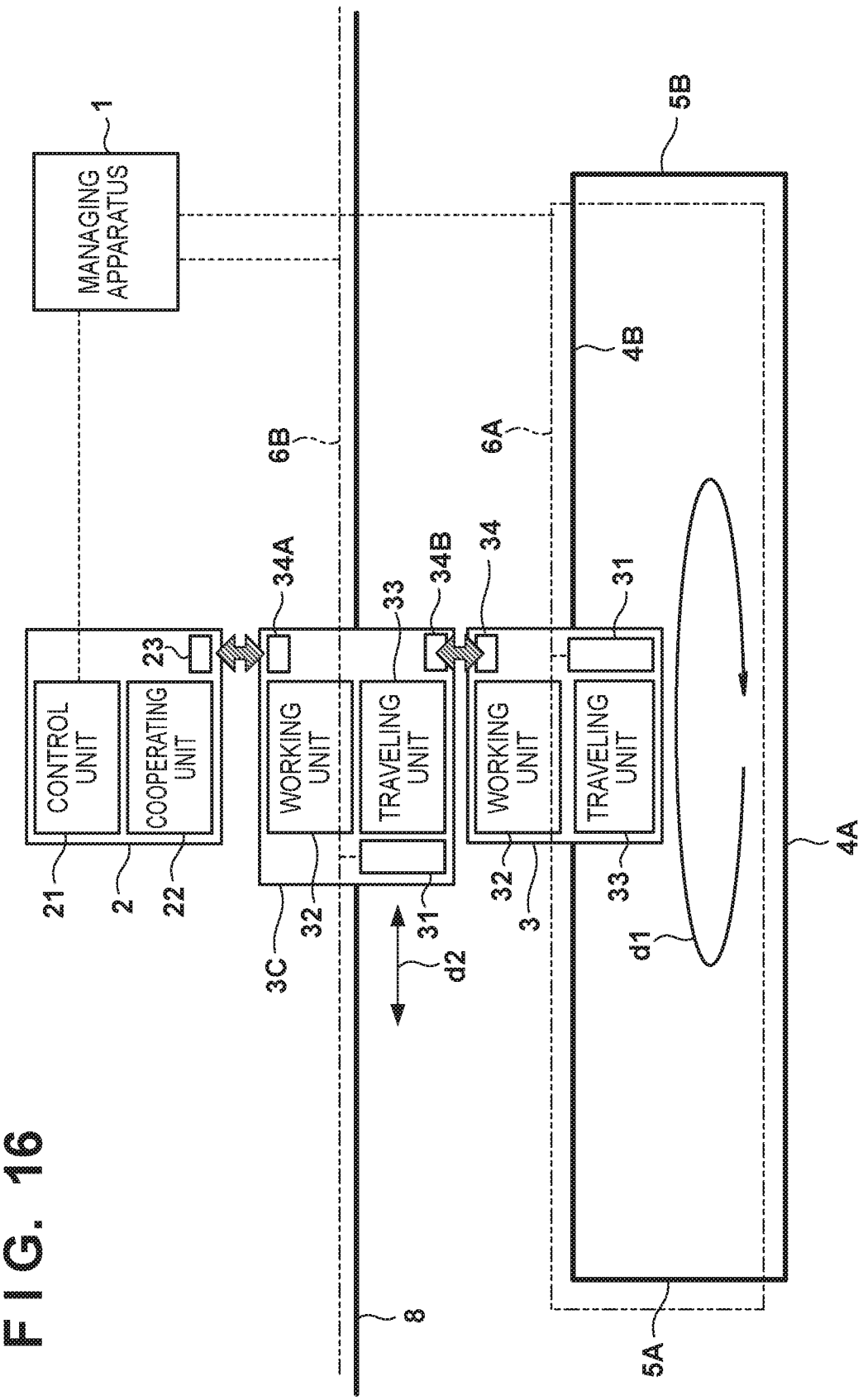

CONTROL METHOD, WORKING SYSTEM, AND MANUFACTURING METHOD

BACKGROUND OF THE INVENTION

Field of the Invention

The present invention relates to a control method, working system, and manufacturing method.

Description of the Related Art

As a form of a system in a production facility, a form which moves a movable apparatus including a working unit to a working position and drives the working unit has been proposed. For example, each of Japanese Patent Laid-Open No. 4-14437 and Japanese Patent No. 4979084 has disclosed a system which moves a cart on which a tire molding drum is mounted to a predetermined working position and performs a molding work.

An example of a method of improving the working efficiency is to efficiently move a movable apparatus to an empty working position. For this purpose, it is necessary to recognize the status of a working position.

SUMMARY OF THE INVENTION

It is an object of the present invention to recognize the status of a working position.

According to an aspect of the present invention, there is provided a control method of a working system, the working system comprising: at least one movable apparatus movable on a predetermined moving path; and at least one stationary apparatus arranged along the moving path, the movable apparatus comprising a working unit configured to perform a predetermined work, and the stationary apparatus comprises a control unit configured to perform drive control of the working unit, the control method comprising: a moving step of moving the movable apparatus to a working position set on the moving path and corresponding to the stationary apparatus; a communication instruction step of instructing, when the movable apparatus has reached the working position in the moving step, the control unit of the stationary apparatus corresponding to the working position to establish communication for the drive control with the working unit of the movable apparatus; a first updating step of updating status information indicating a communication establishment status, after the communication instruction; a signal transmission instruction step of instructing the control unit to transmit an operation signal to the working unit in the working position; a disconnection instruction step of instructing the control unit to disconnect the communication, after the signal transmission instruction step; and a second updating step of updating the status information after the disconnection instruction.

According to another aspect of the present invention, there is provided a control method of a working system, the working system comprising: one movable apparatus movable on a predetermined moving path; and a plurality of stationary apparatuses arranged along the moving path, the movable apparatus comprising a working unit configured to perform a predetermined work, and each of the plurality of stationary apparatuses comprising a control unit configured to perform drive control of the working unit, the control method comprising: a moving step of sequentially moving the movable apparatus to working positions set on the moving path and corresponding to the plurality of stationary apparatuses; a communication instruction step of instructing, when the movable apparatus has reached one of the working positions in the moving step, the control unit of one of the stationary apparatuses, which corresponds to the working position, to establish communication for the drive control with the working unit of the movable apparatus; a first updating step of updating status information indicating a communication establishment status, after the communication instruction; a signal transmission step of instructing the control unit, which is instructed to establish communication in the communication instruction step, to transmit an operation signal to the working unit in the working position; a disconnection instruction step of instructing the control unit, which is instructed to transmit the operation signal in the signal transmission step, to disconnect the communication, after the signal transmission step; and a second updating step of updating each of the status information after the disconnection instruction.

According to still another aspect of the present invention, there is provided a control method of a working system, the working system comprising: a plurality of movable apparatuses movable on a predetermined moving path; and one stationary apparatus arranged along the moving path, each of the plurality of movable apparatuses comprising a working unit configured to perform a predetermined work, and the stationary apparatus comprising a control unit configured to perform drive control of each of the working units, the control method comprising: a moving step of sequentially moving the plurality of movable apparatuses to a working position set on the moving path and corresponding to the stationary apparatus; a communication instruction step of instructing, when one of the plurality of movable apparatuses has reached the working position in the moving step, the control unit to establish communication for the drive control with the working unit of the movable apparatus having reached the working position; a first updating step of updating status information indicating a communication establishment status, after the communication instruction; a signal transmission step of instructing the control unit to transmit an operation signal to the working unit in the working position; a disconnection instruction step of instructing the control unit to disconnect the communication, after the signal transmission step; and a second updating step of updating the status information after the disconnection instruction.

According to still another aspect of the present invention, there is provided a working system comprising: at least one movable apparatus movable on a predetermined moving path; at least one stationary apparatus arranged along the moving path; and a managing apparatus configured to manage the movable apparatus and the stationary apparatus, wherein the movable apparatus comprises a working unit configured to perform a predetermined work, the stationary apparatus comprises a control unit configured to perform drive control of the working unit, the control unit and the working unit are able to communicate with each other, and the managing apparatus performs: a movement control of moving the movable apparatus to a working position set on the moving path and corresponding to the stationary apparatus; a communication instruction of instructing, when the movable apparatus has reached the working position, the control unit of the stationary apparatus corresponding to the working position to establish communication for the drive control with the working unit of the movable apparatus; a first update of updating status information indicating a communication establishment status, after the communication instruction; a signal transmission instruction of instructing the control unit to transmit an operation signal to the working unit in the working position; a disconnection instruction of instructing the control unit to disconnect the communication, after the operation signal is transmitted; and a second update of updating the status information after the disconnection instruction.

According to still another aspect of the present invention, there is provided a manufacturing method of manufacturing a product by winding a member into a ring form by a manufacturing system, wherein the manufacturing system comprises: at least one movable apparatus movable on a predetermined moving path; and at least one stationary apparatus arranged along the moving path; the movable apparatus comprising a working unit including a driving mechanism configured to rotate a rotary body, and the stationary apparatus comprising: a supply mechanism configured to supply the member to the working unit; and a control unit configured to perform drive control of the supply unit and the working unit, the manufacturing method comprises: a moving step of moving the movable apparatus to a working position set on the moving path and corresponding to the stationary apparatus; a communication instruction step of instructing, when the movable apparatus has reached the working position in the moving step, the control unit of the stationary apparatus corresponding to the working position to establish communication for the drive control with the working unit of the movable apparatus; a first updating step of updating status information indicating a communication establishment status, after the communication instruction; a signal transmission instruction step of instructing the control unit to transmit an operation signal to the working unit in the working position; a disconnection instruction step of instructing the control unit to disconnect the communication, after the signal transmission instruction step; and a second updating step of updating the status information after the disconnection instruction, and in the signal transmission instruction step, the control unit controls supply of the member by the supply mechanism, and controls winding of the member around the rotary body by the driving mechanism.

Further features of the present invention will become apparent from the following description of exemplary embodiments (with reference to the attached drawings).

BRIEF DESCRIPTION OF THE DRAWINGS

FIG. 5 is a view showing examples of information to be stored in the stationary apparatus and movable apparatus;

FIG. 8 is a view showing a control example of the working system;

FIG. 9 is a view showing a control example of the working system;

FIG. 10 is a view showing a control example of the working system;

FIG. 11 is a view showing a control example of the working system;

FIG. 12 is a view showing a control example of the working system;

FIG. 16 is a view showing still another configuration example of the working system.

DESCRIPTION OF THE EMBODIMENTS

<Outline of System>

Figure 1:
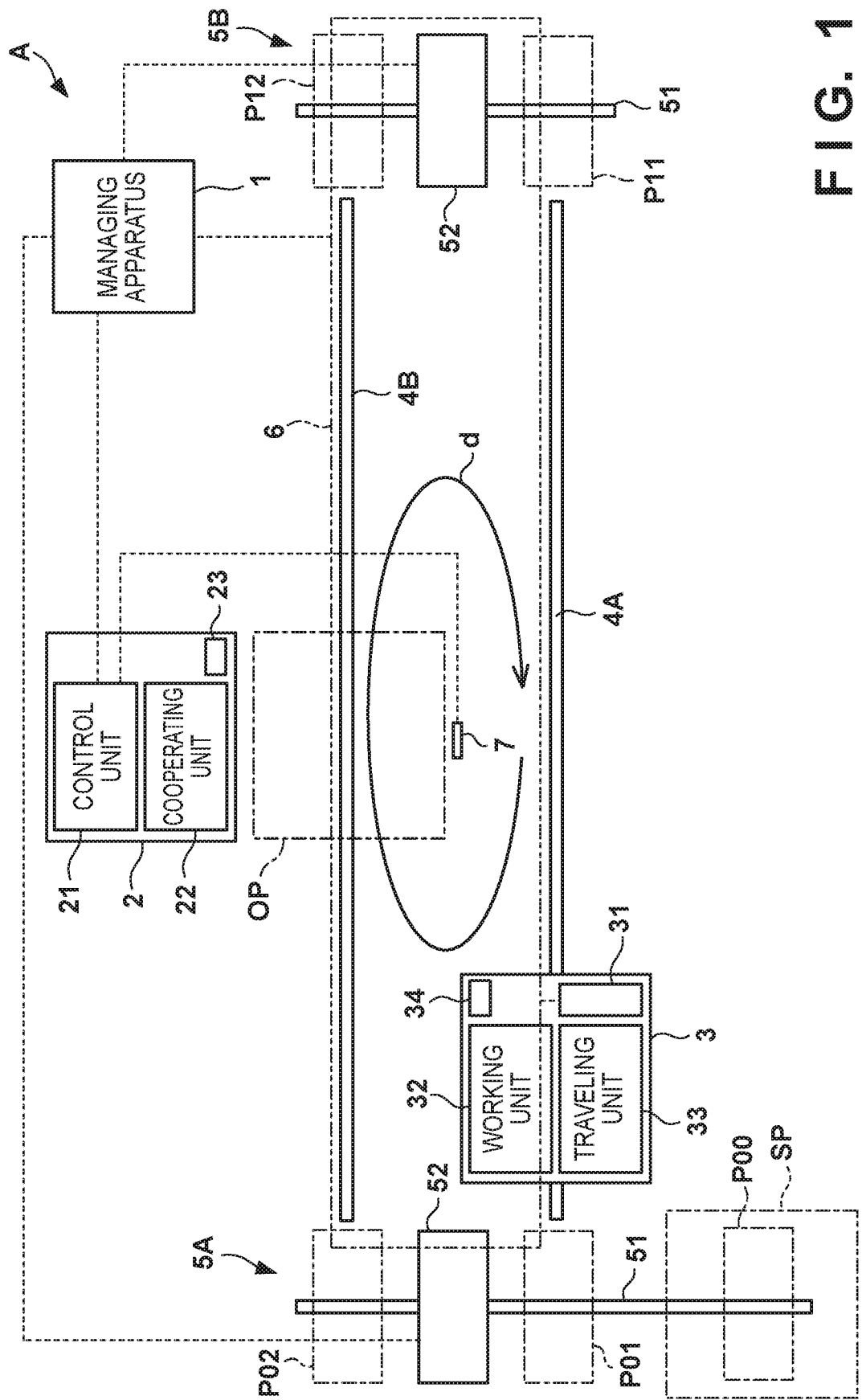
FIG. 1 is a schematic view of a working system according to an embodiment of the present invention.

FIG. 1 is a schematic view (layout view) of a working system A according to an embodiment of the present invention. The working system A is applicable to various kinds of manufacturing systems. The working system A of this embodiment constitutes a system for manufacturing a product by winding a member (in this system, a belt-like member) into the form of a ring (in this system, a cylindrical form), particularly, a tire manufacturing system. The working system A includes a managing apparatus 1, a stationary apparatus 2, and a movable apparatus 3.

The managing apparatus 1 is a controller which controls the whole working system A. The movable apparatus 3 can move on a moving path defined by rails 4A and 4B and conveyors (traversers) 5A and 5B. For example, the movable apparatus 3 is circularly movable in the order of rail 4A→conveyor 5A→rail 4B→conveyor 5B→rail 4A, as indicated by an arrow d. The stationary apparatus 2 is arranged along the moving path of the movable apparatus 3, and the position is fixed. In the example shown in FIG. 1, the stationary apparatus 2 is arranged adjacent to the rail 4B, and faces the rail 4B.

The movable apparatus 3 includes a control unit 31, a working unit 32, a traveling unit 33, and a communication unit 34. Since the movable unit 3 includes the traveling unit 33, the movable unit 3 travels in a partial section of the moving path. More specifically, the movable apparatus 3 travels on the rails 4A and 4B in a section of the rails 4A and 4B, and is conveyed by the conveyors 5A and 5B in a section of the conveyors 5A and 5B. Note that the movable apparatus 3 travels in the partial section of the moving path in this embodiment, but the movable apparatus 3 may also travel in the whole section of the moving path, or may also be conveyed by a conveyance apparatus such as a conveyor in the whole section of the moving path.

The traveling unit 33 has a rack-pinion mechanism type arrangement including a slider which engages with the rails 4A and 4B, a pinion which meshes with racks placed along the rails 4A and 4B, and a driving mechanism which drives the pinion. As another arrangement example, the traveling unit 33 may also have a cart type arrangement which includes driving wheels and runs on the floor of a factory.

The conveyors (traversers) 5A and 5B each include a rail 51 and a conveyor table 52, and the conveyor table 52 moves along the rail 51. As a moving mechanism of the conveyor table 52, it is possible to adopt a rack-pinion mechanism, a belt-type transmitting mechanism, or the like. The conveyor table 52 moves with the movable apparatus 3 being mounted on it.

In the conveyor 5A, three positions P00, P01, and P02 are set as stop positions of the conveyor table 52. The position P00 is a position where the movable apparatus 3 is loaded into the system, or the movable apparatus 3 is unloaded from the system. In the position P00, the position of the movable apparatus 3 mounted on the conveyor table 52 can be set as an initial position (origin coordinates) SP of the coordinates of movement control. The position P01 is a position where the movable apparatus 3 is transferred between the conveyor table 52 and the rail 4A. The position P02 is a position where the movable apparatus 3 is transferred between the conveyor table 52 and the rail 4B.

In the conveyor 5B, two positions P11 and P12 are set as stop positions of the conveyor table 52. The position P11 is a position where the movable apparatus 3 is transferred between the conveyor table 52 and the rail 4A. The position P12 is a position where the movable apparatus 3 is transferred between the conveyor table 52 and the rail 4B.

The control unit 31 controls the traveling unit 33 in accordance with instructions from the managing apparatus 1. A communication method between the managing apparatus 1 and the control unit 31 can be either wired communication or wireless communication. In this embodiment, wired communication using a trolley 6 is adopted. The trolley 6 is laid out along the moving path of the movable apparatus 3, and includes a power supply line for the movable apparatus 3, and a communication line between the movable apparatus 3 and the managing apparatus 1. The movable apparatus 3 has a terminal unit which comes in slide contact with the wire of the trolley 6, and is electrically connected to the trolley 6 in an arbitrary position on the moving path.

The working unit 32 is a unit for performing a predetermined work. In this embodiment, the working unit 32 is controlled not by the control unit 31 but by a control unit 21 of the stationary apparatus 2. The communication unit 34 is a unit which performs communication between the stationary apparatus 2 and the movable apparatus 3.

The stationary apparatus 2 includes the control unit 21, a cooperating unit 22, and a communication unit 23. The control unit 21 is communicably connected to the managing apparatus 1, and executes processing in accordance with instructions from the managing apparatus 1. A communication method between the managing apparatus 1 and the control unit 21 can be either wired communication or wireless communication. The control unit 21 also controls driving of the working unit 32 of the movable apparatus 3 by performing communication via the communication units 23 and 34.

The cooperating unit 22 is a working unit which operates in cooperation with the working unit 32 when the movable apparatus 3 is in a working position OP. The control unit 21 controls driving of the cooperating unit 22. In this embodiment, a specific work can be executed between the stationary apparatus 2 and the working apparatus 3 by controlling the working unit 32 and cooperating unit 22 by the control unit 21. However, it is also possible to adopt an arrangement in which the stationary unit 2 does not include the cooperating unit 22. For example, the working unit 32 having the function of the cooperating unit 22 can also be adopted.

The working position OP is a region including a position where the stationary apparatus 2 faces the rail 4B, and is a position where the working unit 32 of the movable apparatus 3 operates while driving of the working unit 32 is controlled by the control unit 21. A sensor 7 is arranged in the working position OP. The sensor 7 is a sensor for sensing whether the movable apparatus 3 is positioned in the working position OP, i.e., a presence sensor, and is a reflection type photosensor or the like. However, any sensor can be used as long as the sensor can sense the movable apparatus 3. The control unit 21 can acquire the sensing result from the sensor 7, so the control unit 21 can confirm whether the movable apparatus 3 is positioned in the working position OP. Also, when the control unit 21 notifies the managing apparatus 1 of the sensing result from the sensor 7, the managing apparatus 1 can confirm whether the movable apparatus 3 is positioned in the working position OP.

In this embodiment, the communication units 23 and 34 are wireless communication units (optical data transmitting devices) using optical communication. The use of the wireless communication units obviates the need for lines between the apparatuses, so the degree of freedom of movement of the movable apparatus 3 improves. Each of the communication units 23 and 34 includes a light-emitting element and light-receiving element. The transmitting side transmits data by driving the light-emitting element, and the receiving side (optically) receives the transmitted data by the light-receiving element. The communication units 23 and 34 are so arranged as to oppose each other when the movable apparatus 3 is positioned in the working position OP. When the movable apparatus 3 is positioned in the working position OP, the stationary apparatus 2 and movable apparatus 3 can communicate with each other. Since optical communication is adopted, therefore, no communication is performed when the movable apparatus 3 is not positioned in the working position OP. This consequently prevents an event in which a communication operation is performed although the movable apparatus 3 is not positioned in the working position OP.

Note that the communication units 23 and 34 are optical communication units in this embodiment, but it is also possible to use wireless communication units of another type or wired communication units. When using the wired communication units, it is possible to use a system in which the worker connects communication lines when the movable apparatus 3 is positioned in the working position OP and disconnects the lines after the work, or a system in which communication lines are automatically and mechanically connected and disconnected.

<Examples of Working Unit and Cooperating Unit>

Figure 2:
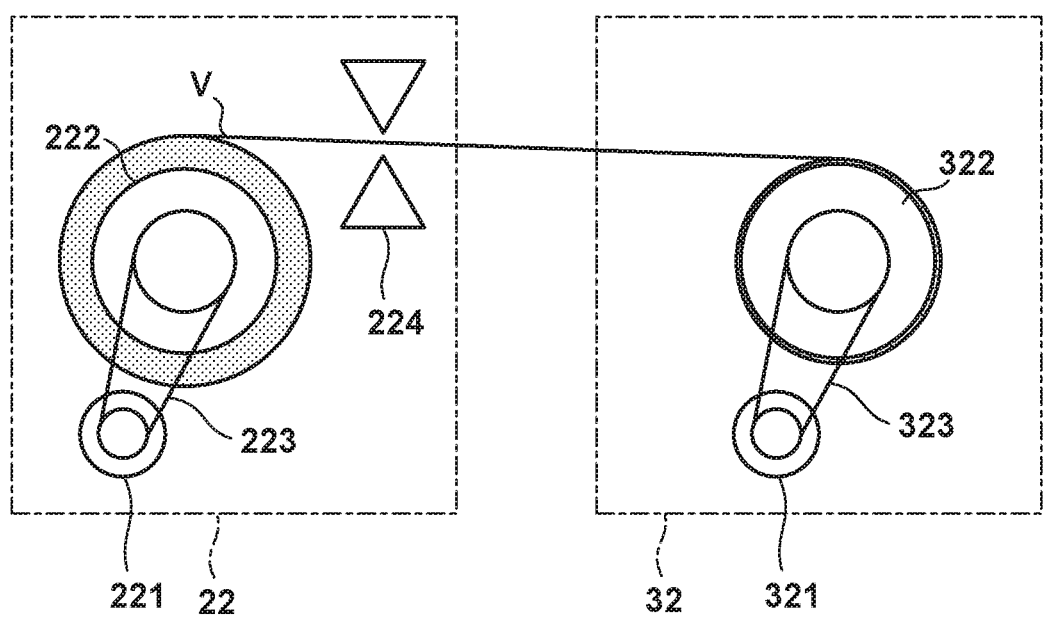
FIG. 2 is a view for explaining examples of a working unit and cooperating unit.

FIG. 2 is a schematic view for explaining examples of the working unit 32 and cooperating unit 22. In the examples shown in FIG. 2, the cooperating unit 22 is a part supply unit, and the working unit 32 is a unit for assembling a supplied part. More specifically, the cooperating unit 22 supplies a belt-like member V forming a tire, and the working unit 32 winds the supplied belt-like member V into a ring-like shape.

As a mechanism for supplying the belt-like member V, the cooperating unit 22 includes a rotary body (drum) 222 around which the belt-like member V is wound, and a rotary driving mechanism capable of rotating the drum 222 at a predetermined rotational speed. The rotary driving mechanism includes a driving source 221 and a power transmitting mechanism 223. In this embodiment, the driving source 221 is a servo motor, and the power transmitting mechanism 223 is a belt-type transmitting mechanism. The drum 222 rotates when driven by the servo motor 221, and feeds the belt-like member V wound around the drum 222 to the working unit 32. The cooperating unit 22 also includes a cutter unit 224, and can cut the fed belt-like member V. The cutter unit 224 includes a blade and a driving mechanism for driving the blade.

The working unit 32 includes a rotary body (drum) 322 around which the belt-like member V is wound, and a rotary driving mechanism capable of rotating the drum 322 at a predetermined rotational speed. The rotary driving mechanism includes a driving source 321 and a power transmitting mechanism 323. In this embodiment, the driving source 321 is a servo motor, and the power transmitting mechanism 323 is a belt-type transmitting mechanism. The drum 322 rotates when driven by the servo motor 321, and the belt-like member V fed from the cooperating unit 22 is wound around the drum 322.

To properly wind the belt-like member V around the drum 322, an appropriate tension must be given to the belt-like member V between the drums 322 and 222. In this embodiment, the control unit 21 of the stationary apparatus 2 controls the rotations of both the servo motors 221 and 321 (synchronous control). This makes it possible to give an appropriate tension to the belt-like member V, and properly wind the belt-like member V around the drum 322. That is, the control unit 21 controls the supply speed of the belt-like member V by controlling the rotation of the servo motor 221. Also, the control unit 21 controls the winding speed of the belt-like member V by controlling the rotation of the servo motor 321, thereby adjusting the tension of the belt-like member V. Furthermore, when the winding work is complete, the control unit 21 can cut the belt-like member V by the cutter unit 224.

<Control Systems>

Figure 3:
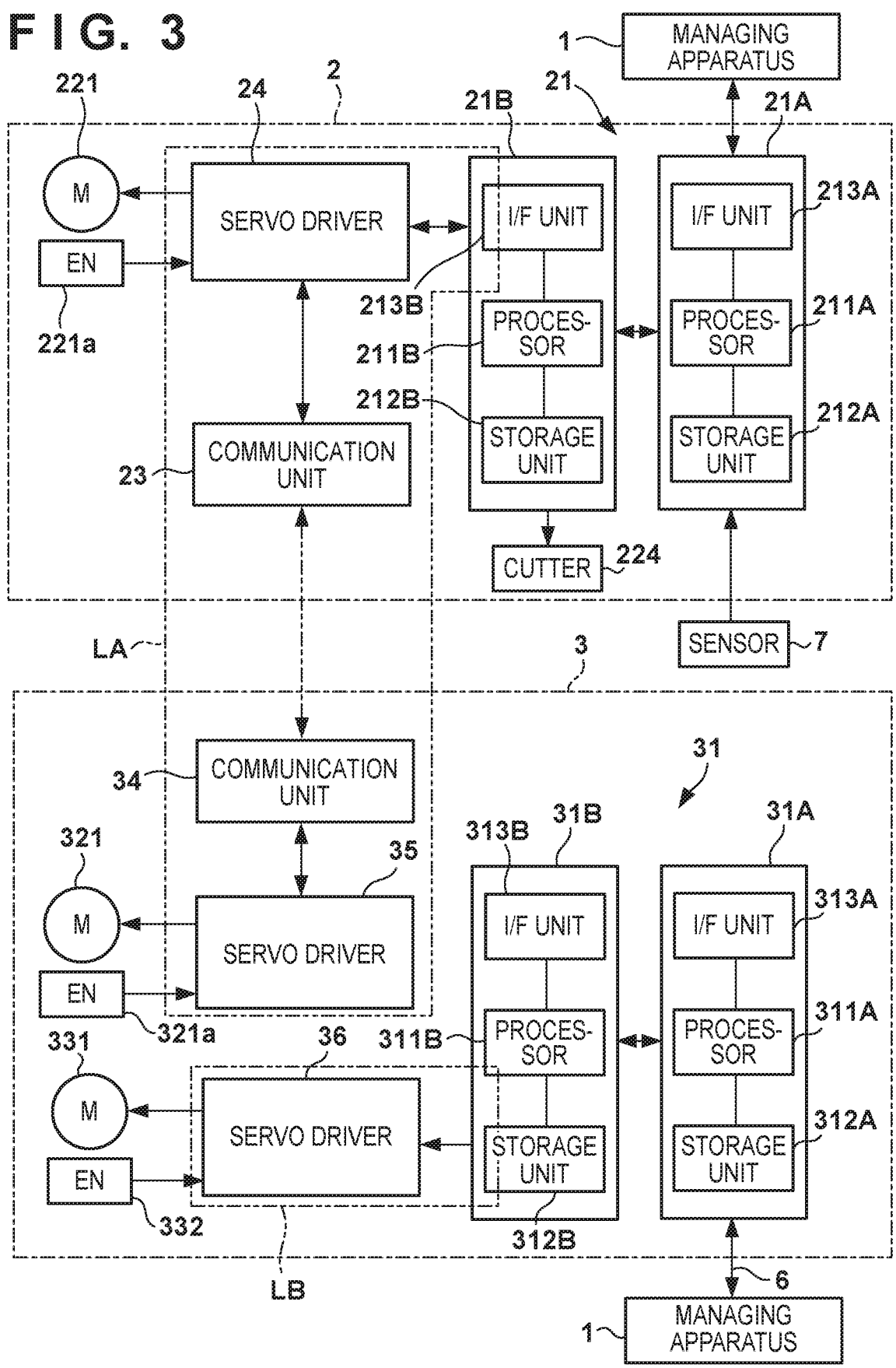
FIG. 3 is a block diagram of a stationary apparatus and movable apparatus.

FIG. 3 is a block diagram of the control systems of the stationary apparatus 2 and movable apparatus 3. First, the stationary apparatus 2 will be explained.

The control unit 21 of the stationary apparatus 2 includes a main control unit 21A and a motion control unit 21B. In this embodiment, the main control unit 21A controls the whole stationary apparatus 2 and controls communication with the managing apparatus 1, and the motion control unit 21B controls the cooperating unit 22, working unit 32, and cutter 224. However, these control units can also be configured by a single control unit.

The main control unit 21A and motion control unit 21B respectively include processors 211A and 211B such as CPUs, storage units 212A and 212B such as RAMs or ROMs, and I/F units 213A and 213B as interfaces between an external device and the processors 211A and 211B. The motion control unit 21B controls the operation of the servo motor 221 connected via the servo driver 24 and the servo motor 321 connected via a servo driver 35.

The interface units 213A and 213B include communication interfaces. The main control unit 21A communicates with the managing unit 1 and motion control unit 21B.

The processors 211A and 211B respectively execute programs stored in the storage units 212A and 212B. The processor 211A also performs processing corresponding to an instruction from the managing unit 1. In addition to the programs to be executed by the processors 211A and 211B, the storage units 212A and 212B store various kinds of data. Also, the processor 211B communicates with the servo driver 35 via the servo driver 24, communication unit 23, and communication unit 34.

The processor 211B executes a process of generating a servo link LA (a servo communication system) based on driver information of the servo drivers 24 and 35 stored in the storage unit 212B, and performs a servo operation process after that. The storage unit 212B stores servo system information of all connectable servo drivers (for example, when three servo drivers are connected, the storage unit 212B stores servo system information of the three servo drivers).

FIG. 5 shows an example of servo system information 21a. The servo system information 21a contains connected servo identification information, servo link group information, communication establishment status, present value information, stationary apparatus ID, connected unit ID, and operation information. The servo system information 21a is updated at a predetermined timing.

All servo motors (servo drivers) controllable by the motion control unit 21B are preregistered in the servo system information 21a.

The connected servo identification information is information for identifying servo drivers, such as the servo drivers 24 and 35, connectable to the motion control unit 21B, and is information unique to each servo driver. For example, this identification information can be set by a switch such as a DIP switch of the servo driver 24 or 35, or a storage unit for storing allocated identification information can also be used.

The servo link group information is information of a group forming a servo link, and the communication establishment status is information indicating whether a servo link is formed. For example, a group A of the servo link group information is equivalent to the link group LA surrounded by the alternate long and two short dashed lines in FIG. 3.

When a plurality of stationary apparatuses 2 are arranged in the working system to be managed by the managing apparatus 1, the stationary apparatus ID is used as identification information of each stationary apparatus 2, by which the managing apparatus 1 identifies a servo driver belonging to the stationary apparatus. This example shown in FIG. 5 includes one stationary apparatus 2, so the stationary apparatus ID in the servo system information 21a is A01.

The present value information is information indicating the present value of an encoder of a servo motor to be controlled by the corresponding servo driver.

The connected unit ID is information for identifying connected units (in this embodiment, the cooperating unit 22 and working unit 32) to be driven by the corresponding servo driver, and is information unique to the cooperating unit 22 (K01 in FIG. 5) and working unit 32 (C01 and C02 in FIG. 5) connected to the servo link.

The operation information is correction information for control of the cooperating unit 22 and working unit 32 to be driven by the corresponding servo driver. When performing control based on this correction information, more accurate operation control can be performed by correcting a mechanical error or the like between different working units.

The stationary apparatus 2 includes the servo driver 24 to be controlled by the motion control unit 21B. The servo driver 24 forms a driving circuit of the cooperating unit 22, and drives the servo motor 221 in accordance with instructions from the motion control unit 21B. The servo motor 221 includes an encoder 221a for detecting the rotation amount, so the servo driver 24 can drive the servo motor 221 based on the detection result from the encoder 221a.

The motion control unit 21B also controls a peripheral device such as the cutter 224. The sensor 7 is connected to the main control unit 21A. The main control unit 21A acquires the sensing result from the sensor 7, and confirms the status of the working position. The sensing result from the sensor 7 is transmitted to the managing apparatus 1.

Next, the movable apparatus 3 will be explained. The control unit 31 of the movable apparatus 3 includes a main control unit 31A and a motion control unit 31B. In this embodiment, the main control unit 31A controls the whole movable apparatus 3 and controls communication with the managing apparatus 1, and the motion control unit 31B controls the traveling unit 33. However, these control units can also be configured by a single control unit.

The main control unit 31A and motion control unit 31B respectively include processors 311A and 311B such as CPUs, storage units 312A and 312B such as RAMs or ROMs, and I/F units 313A and 313B as interfaces between an external device and the processors 311A and 311B. The interface units 313A and 313B include communication interfaces. The main control unit 31A communicates with the managing unit 1 and motion control unit 31B.

The processors 311A and 311B respectively execute programs stored in the storage units 312A and 312B. The processor 311A also performs processing corresponding to an instruction from the managing unit 1. In addition to the programs to be executed by the processors 311A and 311B, the storage units 312A and 312B store various kinds of data.

The processor 311B executes a process of generating a servo link LB (a servo communication system) based on driver information of the servo drivers stored in the storage unit 312B, and performs a servo operation process after that. The storage unit 312B stores servo system information of all connectable servo drivers (for example, when one servo driver is connected, the storage unit 312B stores servo system information of the one servo driver).

FIG. 5 shows an example of servo system information 31a. The servo system information 31a contains connected servo identification information, servo link group information, communication establishment status, present position information, movable apparatus ID, and working position information. The servo system information 31a is updated at a predetermined timing.

All servo motors (servo drivers) controllable by the motion control unit 31B are preregistered in the servo system information 31a.

The connected servo identification information is information for identifying a servo driver, such as a servo driver 36, connectable to the motion control unit 31B, and is information unique to each servo driver. For example, this identification information can be set by a switch such as a DIP switch of the servo driver 36, or a storage unit for storing allocated identification information can also be used.

The servo link group information is information of a group forming a servo link, and information indicating whether a communication establishment status has formed a servo link. For example, a group B of the servo link group information is equivalent to a link group LB surrounded by the alternate long and two short dashed lines in FIG. 3. In this embodiment, it is assumed that the traveling unit 33 includes one motor as a driving motor, so the link group LB includes only one servo driver 36. However, if a plurality of motors are allocated to a plurality of wheels, there are a plurality of corresponding servo drivers, so the link group LB contains a plurality of servo drivers.

The present position information is information indicating the present position of the movable apparatus 3. The movable apparatus ID is identification information when a plurality of movable apparatuses exist with respect to the managing apparatus 1. In this example shown in FIG. 5, only one movable apparatus 3 exists, so the movable apparatus ID in the servo system information 31a is B01. Based on this information, the managing apparatus 1 identifies a specific movable apparatus from a plurality of movable apparatuses. The working position information is target position information, and is position information for positioning the movable apparatus 3 in the working position OP. When the working position information matches the present position information, the process of moving the movable apparatus 3 can be terminated.

The movable apparatus 3 includes the servo driver 36 to be controlled by the motion control unit 31B. The servo driver 36 forms a driving circuit of the traveling unit 33, and drives a servo motor 331 of the traveling unit 33 in accordance with instructions from the control unit 31. The servo motor 331 includes an encoder 332a for detecting the rotation amount, so the servo driver 36 can drive the servo motor 331 based on the detection result from the encoder 332a.

In this embodiment, the encoder 332a is used as a detection unit for detecting the present position of the movable apparatus 3. The control unit 31 can transmit present position information of the movable apparatus 3 based on the detection result from the encoder 332a to the managing apparatus 1 via the trolley 6. Note that the encoder 332a is used as the present position detection unit in this embodiment, but it is also possible to use another detection unit for detecting the present position of the movable apparatus 3. This detection unit can be a unit for reading position codes arranged along the moving path of the movable apparatus 3, and can also be a GPS sensor or the like.

The movable apparatus 3 includes the servo driver 35 forming a driving circuit of the working unit 32. The communication unit 34 is connected to the servo driver 35, and the servo driver 35 is controlled not by the motion control unit 31B but by the motion control unit 21B. That is, the motion control unit 21B generates the link group LA of the servo driver 35 and servo link by performing communication via the communication units 23 and 34, and controls driving of the working unit 32 via the servo driver 35. Since the motion control unit 31B of the movable apparatus 3 is used to control driving of the traveling unit 33, the control unit 31 can also be omitted if the movable apparatus 3 does not travel by itself but is conveyed by a conveyor or the like.

The servo driver 35 drives the servo motor 321 in accordance with instructions from the motion control unit 21B. The servo motor 221 of the cooperating unit 22 and the servo motor 321 of the working unit 32 are included in the link group LA of the servo link controlled by the common motion control unit 21B. Therefore, it is possible to precisely and smoothly perform cooperative control of the two servo motors. The servo motor 321 includes an encoder 321a for detecting the rotation amount, and the servo driver 35 can drive the servo motor 321 based on the detection result from the encoder 321a.

Figure 4:
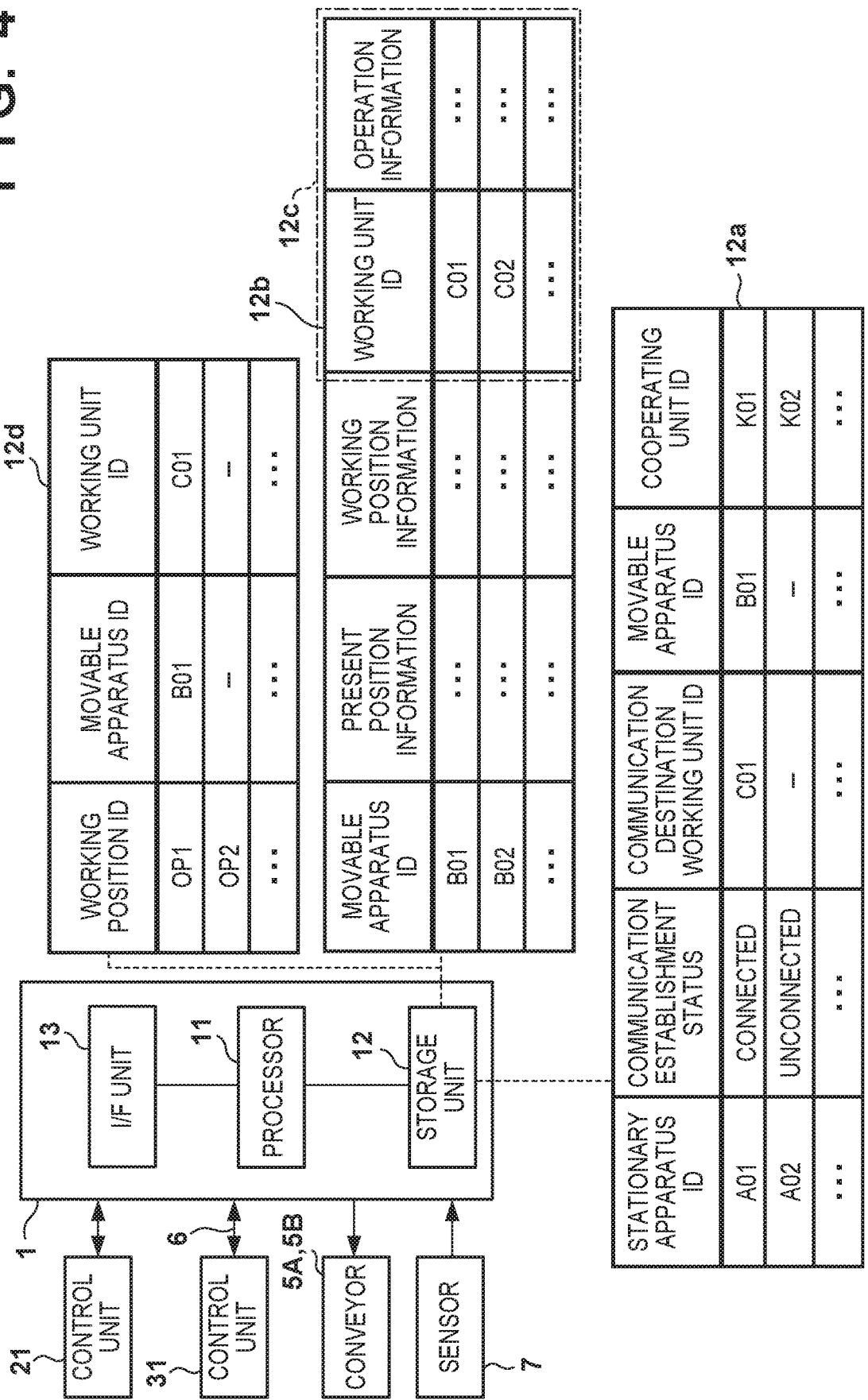
FIG. 4 is a block diagram of a managing unit.

Next, the configuration of the control system of the managing apparatus 1 will be explained with reference to FIG. 4. FIG. 4 is a block diagram of the control system of the managing apparatus 1. The managing apparatus 1 includes a processor 11 such as a CPU, a storage unit 12 such as a RAM, ROM, or HDD, and an I/F unit 13 as an interface between an external device and the processor 11. The I/F unit 13 includes a communication interface for communicating with the control unit 21 and the like.

The processor 11 executes programs stored in the storage unit 12, thereby giving instructions to the control units 21 and 31, and controlling driving of the conveyors 5A and 5B. In addition to the programs to be executed by the processor 11, the storage unit 12 stores various kinds of data. FIG. 4 shows stationary apparatus information 12a, movable apparatus information 12b, and working position information 12d, as examples of the data stored in the storage unit 12. These pieces of information are synchronized with the servo system information 21a and 31a shown in FIG. 5. Pieces of information having the same contents are given the same name in FIGS. 4 and 5.

A main purpose of the stationary apparatus information 12a is to manage the stationary apparatus 2. Although the example shown in FIG. 1 includes one stationary apparatus 2, the stationary apparatus information 12a is set for each stationary apparatus 2 existing in the system. The stationary apparatus information 12a contains a stationary apparatus ID, communication establishment status, communication destination working unit ID, movable apparatus ID, and cooperating unit ID.

The stationary apparatus ID is identification information unique to each stationary apparatus 2. FIG. 4 shows an example case in which at least two stationary apparatuses 2 having IDs A01 and A02 are registered.

The communication establishment status is status information indicating a communication establishment status between the stationary apparatus 2 and the movable apparatus 3. If the cooperating unit 22 (the servo driver 24) and the working unit 32 (the servo driver 35) having established servo links to the registered stationary apparatus 2 via the communication units 23 and 34 exist, "connected" is recorded. If no servo link is established to any connected units (the cooperating units 22 and working unit 32), "unconnected" is recorded.

This information allows the managing unit 1 to recognize the status of the working position OP, and facilitates managing the conveyance of the movable apparatus 3 to the working position OP. The communication destination working unit ID is identification information of the working unit 32 of the communication destination (that is, connected unit information given based on the identification information of the servo driver 35). The working unit 32 of the communication destination herein mentioned is a working unit as a target of establishment of the link group LA of the servo link based on the servo system information 21a stored in the motion control unit 21B of the control unit 21 of the stationary apparatus 2.

The movable apparatus ID is identification information of the movable apparatus 2 stopped in the working position OP of the stationary apparatus 2. This information allows the managing apparatus 1 to recognize the movable apparatus 2 stopped in the working position OP of each stationary apparatus 2. The cooperating unit ID is identification information of the cooperating unit 22 of the stationary apparatus 2. FIG. 4 shows an example case in which at least two cooperating units 22 having IDs K01 and K02 are registered. This information allows the managing apparatus 1 to recognize each cooperating unit 22 formed in each stationary apparatus 2.

The movable apparatus information 12b is information whose main purpose is to manage the movable apparatus 3. Although the example shown in FIG. 1 includes one movable apparatus 3, the movable apparatus information 12b is set for each movable apparatus 3 existing in the system. The movable apparatus information 12b contains a movable apparatus ID, present position information, working position information, working unit ID, and operation information.

The movable apparatus ID is identification information unique to each movable apparatus 3. FIG. 4 shows an example case in which at least two movable apparatuses 3 having IDs B01 and B02 are registered. The present position information is information indicating the present position of the movable apparatus 3 on the moving path, and is information specified by the present position information transmitted from the control unit 31 of the movable apparatus 3.

The working position information is position information when the movable apparatus 3 is positioned in the working position OP. The movable apparatus 3 has an individual difference and the like. Even when the coordinates of the working position OP on the system are, for example, X=100 and Y=100, the actual position coordinates of a given movable apparatus 3 may be X=101 and Y=99. This embodiment includes optical communication performed by causing the communication units 23 and 34 to face each other, and a cooperation of the working unit 32 and cooperating unit 22. Therefore, the positional accuracy of the movable apparatus 3 with respect to the stationary apparatus 2 is desirably high, so the working position and position information are set for each movable apparatus 3. Note that the example shown in FIG. 1 includes one working position OP, but if there are a plurality of working positions, the working position information is set for each working position.

The working unit ID is identification information of the working unit 32 of the movable apparatus 3, which is contained in the servo system information 21a stored in the motion control unit 21B of the stationary apparatus 2 (that is, connected unit information given based on the identification information of the servo driver 35). The operation information is control correction information of the working unit 32, which is contained in the servo system information 21a stored in the motion control unit 21B of the stationary apparatus 2. The working unit 32 has an individual difference. Even when a control command for rotating the drum 322 of the working unit 32 is 100, an actually required control command for a given working unit 32 is sometimes 101. This embodiment includes a cooperative operation of the working unit 32 and cooperating unit 22. Accordingly, the operation accuracy of the working unit 32 is desirably high, so control correction information is set for each working unit 32. Note that in addition to the correction information as described above, the operation information can contain various kinds of information unique to the working unit 32.

The working unit ID and operation information are registered as working unit information 12c in the motion control unit 21B of the stationary apparatus 2, and form a part of the servo system information 21a. When controlling driving of the working unit 32, the motion control unit 21B can control driving of the working unit 32 while correcting a control amount based on corresponding operation information.

The working position information 12d is information whose main purpose is to manage the working position OP and the movable apparatus 3 positioned in the working position OP, and is working unit registration information indicating the relationship between the working position OP and identification information of the working unit 32 of the movable apparatus 3 stopped in the working position OP. Although the example shown in FIG. 1 has one working position OP, the working position information 12d is set for each working position OP existing in the system. The working position information 12d contains a working position ID, movable apparatus ID, and working unit ID. The working position ID is identification information unique to each working position OP. FIG. 4 shows an example case in which at least two working positions OP having IDs OP1 and OP2 are registered. The movable apparatus ID and working unit ID are identification information of the movable apparatus 3 stopped in the working position OP, and identification information of the working unit 32 mounted on the movable apparatus 3.

<System Control Example>

A control example of the working system A will be explained with reference to FIGS. 6 to 13.

Figure 6:
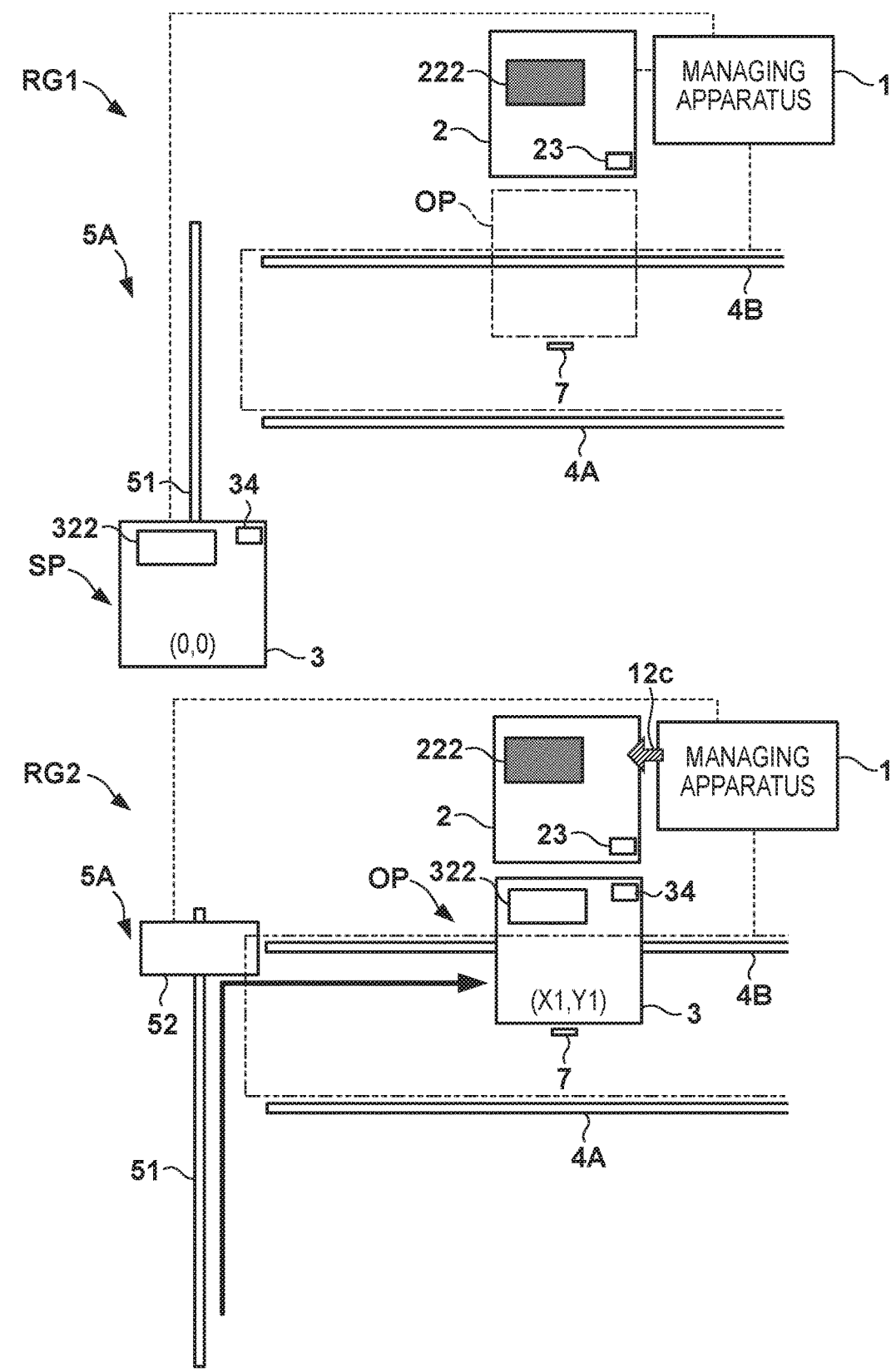
FIG. 6 is a view showing a setting example of the working system.

FIG. 6 shows an example of a process of setting the working position information and operation information of the movable apparatus information 12b. First, the working position information is set. In this embodiment, the working position information is set by so-called teaching.

State RG1 shows a case in which the movable apparatus 3 as a setting target is positioned in the initial position SP (positioned on the conveyor 5A). Assume that the position coordinates of the movable apparatus 3 in this state are (0, 0). Subsequently, the movable apparatus 3 is moved to the working position OP. This movement control can be performed by outputting a movement instruction from the managing apparatus 1, and can also be performed by connecting a portable terminal to the movable apparatus 3 and moving the movable apparatus 3 by instructions from the portable terminal. Then, the position of the movable apparatus 3 is finely adjusted near the working position OP, and an optimal position of the movable apparatus 3 is decided with respect to the stationary apparatus 2 as shown in state RG2.

Based on the detection result from the encoder 332 when the position is decided, the coordinates of working position information unique to the movable apparatus 3 are determined. In this example shown in FIG. 6, the coordinates are determined as (X1, Y1). This coordinate information is registered in the movable apparatus information 12b, and used as a movement target position when moving the movable apparatus 3 to the working position OP. Note that as a method of counting pulses output from the encoder 332, it is possible to adopt a method which performs addition when the movable apparatus 3 travels on the rail 4B, and subtraction when the movable apparatus 3 travels on the rail 4A. Note also that the coordinate values are, for example, values calculated by conversion based on pulse information output from the encoder 332 and rail identification information (not shown) formed on the rails 4A and 4B.

Subsequently, a test operation of the working unit 32 and cooperating unit 22 is performed. Operation information is determined by this test operation. The determined operation information is registered in the movable apparatus information 12b.

As shown in state RG2, the registered working unit information 12c is downloaded from the managing apparatus 1 to the control unit 21 of the stationary apparatus 2, and registered in the storage unit 212 of the control unit 21. Thus, basic preparations for using the movable apparatus 3 in the system are complete.

FIGS. 7 to 12 show a series of control examples in which the movable apparatus 3 is moved to the working position OP, a cooperative work is performed, and the movable apparatus 3 is moved from the working position OP.

Figure 7:
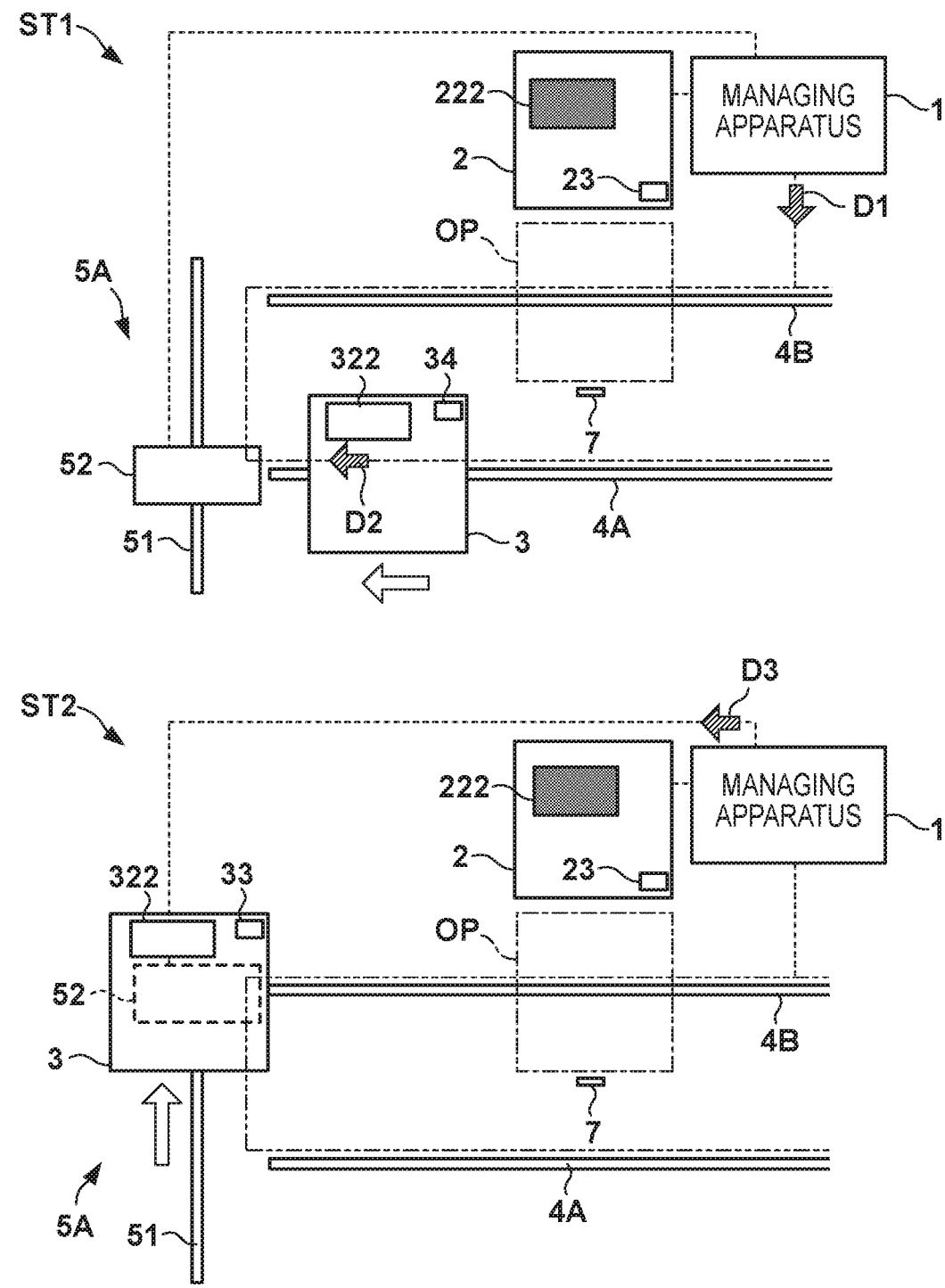
FIG. 7 is a view showing a control example of the working system.

State ST1 shown in FIG. 7 shows a state in which the managing apparatus 1 transmits a movement instruction D1 (movement to the working position OP) to the movable apparatus 3 via the trolley 6, and the movable apparatus 3 starts moving to the working position OP. The movement instruction D1 contains working position information as a target movement position on control. The motion control unit 31B of the movable apparatus 3 stores the working position information from the managing apparatus 1 in the storage unit 312B, and moves the movable apparatus 3 toward the conveyor 5A by driving the traveling unit 33. Present position information D2 based on the detection result from the encoder 332 is transmitted to the managing apparatus 1 at a predetermined period via the trolley 6. Based on the received present position information D2, the managing apparatus 1 updates corresponding present position information of the movable apparatus information 12b. Also, the processor 311B of the movable apparatus 3 compares the stored working position information with the present position information.

When the movable apparatus 3 has reached the conveyor table 52 of the conveyor 5A (when the working position information and present position information match), the managing apparatus 1 temporarily stops the movable apparatus 3 and, as shown in state ST2, outputs a control signal D3, moves the conveyor table 52, conveys the movable apparatus 3 to the rail 4B, and updates corresponding present position information of the movable apparatus information 12b.

When the movable apparatus 3 has reached the rail 4B, the managing apparatus 1 causes the movable apparatus 3 to move again. As shown in state ST3 of FIG. 8, the motion control unit 31B of the movable apparatus 3 moves the movable apparatus 3 toward the working position OP by driving the traveling unit 33. Present position information D4 based on the detection result from the encoder 332 is transmitted to the managing apparatus 1 at a predetermined period via the trolley. Based on the received present position information D4, the managing apparatus 1 updates corresponding present position information of the movable apparatus information 12b.

The motion control unit 31B determines, based on the detection result from the encoder 332, whether the movable apparatus 3 has reached the working position OP, and stops the movable apparatus 3 if it is determined that the movable apparatus 3 has reached the working position OP. As shown in state ST4 of FIG. 8, a notification D5 indicating the arrival of the movable apparatus 3 at the working position OP is transmitted to the managing apparatus 1 via the trolley 6. The managing apparatus 1 receives the notification D5, and recognizes the arrival of the movable apparatus 3 at the working position OP. Also, the main control unit 21A of the stationary apparatus 2 acquires a sensing result D6 from the sensor 7, and confirms that the movable apparatus 3 is stopped in the working position OP by sensing the presence. A sensing result D6' from the sensor 7 is transmitted to the managing apparatus 1, and the working position information 12d is updated. That is, the presence/absence of the movable apparatus 3 in the working position OP is confirmed by double check of the notification D5 and sensing results D6 and D6'. This makes it possible to reliably recognize the status of the working position OP.

Then, as shown in state ST5 of FIG. 9, the managing apparatus 1 outputs an instruction D7 to the control unit 21 of the stationary apparatus 2 so as to establish communication (a servo link) for drive control with the working unit 32 of the movable apparatus 3. More specifically, the managing apparatus 1 outputs the instruction D7 to the control unit 21 of the stationary apparatus 2 so as to establish communication for drive control of the cooperating unit 22 and drive control of the working unit 32 of the movable apparatus 3. The motion control unit 21B performs communication D8 with the servo driver 35 of the working unit 32 via the communication units 23 and 34 and establishes a servo link (the above-described link group LA) by acquiring identification information of the working unit 32 (identification information of the servo driver 35). More specifically, the motion control unit 21B performs the communication D8 with the servo driver 35 of the working unit 32, which includes communication with the servo driver 24 of the cooperating unit 22, via the communication units 23 and 34, acquires identification information of the cooperating unit 22 (identification information of the servo driver 24), acquires identification information of the working unit 32 (identification information of the servo driver 35), and establishes a servo link (the above-described link group LA). The motion control unit 21B recognizes the working unit 32 from the identification information of the working unit 32 and the working unit information 12c, and specifies operation information.

Subsequently, as shown in state ST6, in addition to the identification information of the working unit 32 (and cooperating unit 22), the control unit 21 outputs, to the managing apparatus 1, a notification D9 indicating that communication with the working unit 32 (and cooperating unit 22) is established. The managing apparatus 1 having received the notification D9 recognizes the working unit 32 (and cooperating unit 22) having established the servo link with the motion control unit 21B, and updates the stationary apparatus information 12a (updates the communication establishment status, communication destination working unit ID, movable apparatus ID, and cooperating unit ID).

As shown in state ST7 of FIG. 10, the worker performs a work of extending the belt-like member V from the drum 222 to the drum 322 either manually or automatically by using a device (not shown). After that, the managing apparatus 1 transmits an instruction D10 to the control unit 21 so as to start operations of the cooperating unit 22 and working unit 32. With the instruction D10 as a trigger, the motion control unit 21B transmits operation signals for cooperation to the cooperating unit 22 (the servo driver 24) and the working unit 32 (the servo driver 35), and controls supply of the belt-like member V by the cooperating unit 22, and winding of the belt-like member V around the drum 322 by the working unit 32. As shown in state ST8, therefore, the drums 222 and 322 are rotated by synchronous control (or cooperative control). Consequently, it is possible to supply the belt-like member V to the drum 322 at an appropriate speed (with an appropriate supply amount), and reliably wind the belt-like member V. That is, when taking up the belt-like member V by the drum 322, it is possible to prevent the belt-like member V from being cut or broken by an excess tension, or prevent the belt-like member V from being slacked by a too small tension when taken up. A signal D11 is an operation signal transmitted and received between the motion control unit 21B and the working unit 32 (the servo driver 35) via the communication units 23 and 34.

When the belt-like member V is completely wound around the drum 322, the motion control unit 21B cuts the belt-like member V by driving the cutter unit 224. After that, as shown in state ST9 of FIG. 11, the control unit 21 transmits a notification D12 of the completion of the work to the managing apparatus 1. As shown in state ST10, the managing apparatus 1 transmits an instruction D13 to the control unit 21 so as to disconnect communication with the working unit 32. The motion control unit 21B cancels the connection of communication with the servo driver 35 of the working unit 32 (cancels the link group LA of the servo link).

In state ST11 of FIG. 12, the control unit 21 transmits a notification D15 indicating the completion of the disconnection of communication to the managing apparatus 1, and the managing apparatus 1 updates the stationary apparatus information 12a. As shown in state ST12, the managing apparatus 1 transmits a movement instruction D16 indicating the next movement destination to the movable apparatus 3 via the trolley 6. The motion control unit 31B moves the movable apparatus 3 by driving the traveling unit 33. The managing apparatus 1 acquires the sensing result from the sensor 7, confirms the movement of the movable apparatus 3 from the working position OP, that is, the absence of the movable apparatus 3, and updates the working position information 12d.

<System Configuration Examples>

Other configuration examples of the working system A will be explained with reference to FIGS. 13 to 16.

Figure 13:
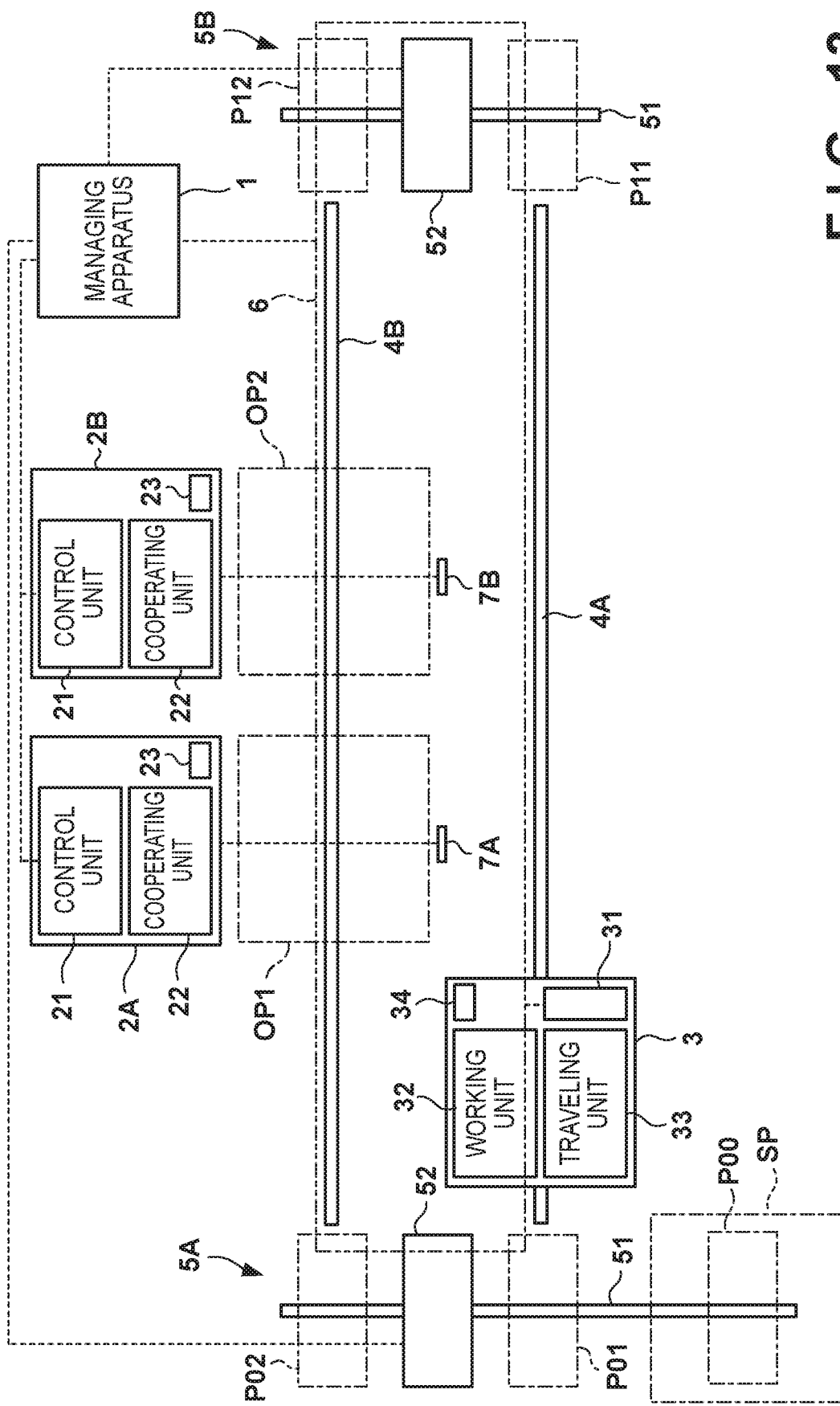
FIG. 13 is a view showing another configuration example of the working system.

FIG. 13 shows an example including a plurality of stationary apparatuses. In this example, two stationary apparatuses 2A and 2B are arranged, and corresponding working positions OP1 and OP2 are set. The movable apparatus 3 is moved in the order of, for example, the working positions OP1 and OP2, and the working unit 32 and the cooperating unit 22 of the stationary apparatus 2A first perform a cooperative work in the working position OP1. After this cooperative work is complete, the movable apparatus 3 is instructed to move to the working position OP2, and the working unit 32 and the cooperating unit 22 of the stationary apparatus 2B perform a cooperative work in the working position OP2. A cooperative work can also be performed by moving the movable apparatus 3 to the same working position a plurality of times, for example, by moving the movable apparatus 3 in the order of the working positions OP1, OP2, and OP1. In these control operations, the processes explained in FIGS. 6 to 12 are properly applicable.

The types, positions, and the like of the belt-like member V to be wound around the drum 322 of the working unit 32 may be different between the cooperating unit 22 of the stationary apparatus 2A and the cooperating unit 22 of the stationary apparatus 2B. Also, the cooperating units 22 may have different working contents. Furthermore, the plurality of stationary apparatuses 2 may include a stationary apparatus which does not include the cooperating unit 22 and controls only the working unit 32.

Figure 14:
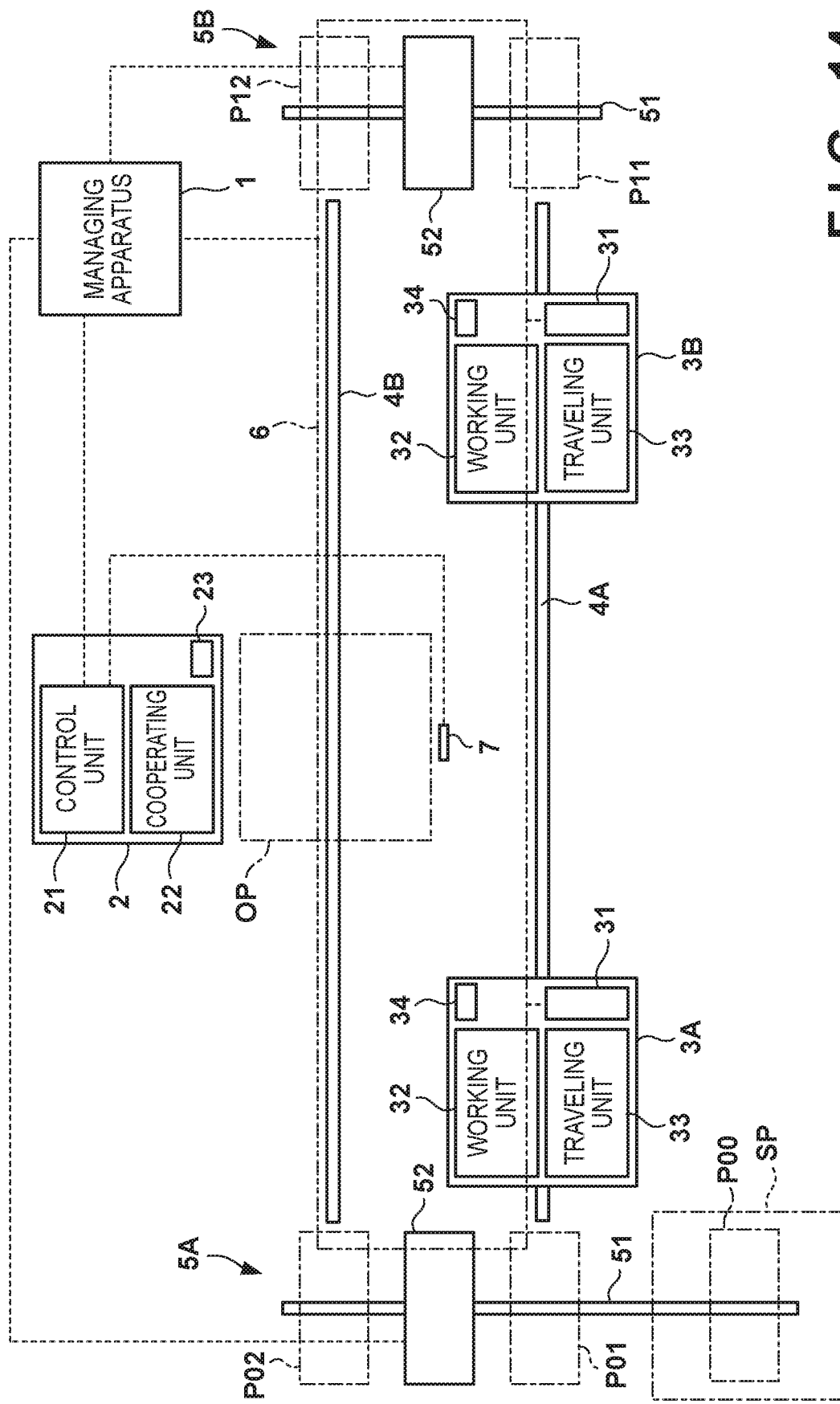
FIG. 14 is a view showing still another configuration example of the working system.

FIG. 14 shows an example including a plurality of movable apparatuses. In this example, two movable apparatuses 3A and 3B are arranged. The movable apparatuses 3A and 3B are moved in this order to the working position OP, and the working unit 32 of the movable apparatus 3A and the cooperating unit 22 of the stationary apparatus 2 first perform a cooperative work. After this cooperative work is complete, the movable apparatus 3A is instructed to move, the movable apparatus 3B is instructed to move to the working position OP, and the cooperating unit 22 and the working unit 32 of the movable apparatus 32B perform a cooperative work. In these control operations, the processes explained in FIGS. 6 to 12 are properly applicable.

The diameters of the drum 322, the winding positions of the belt-like member V, and the like may be different between the working unit 32 of the movable apparatus 3A and the working unit 32 of the movable apparatus 3B.

Figure 15:
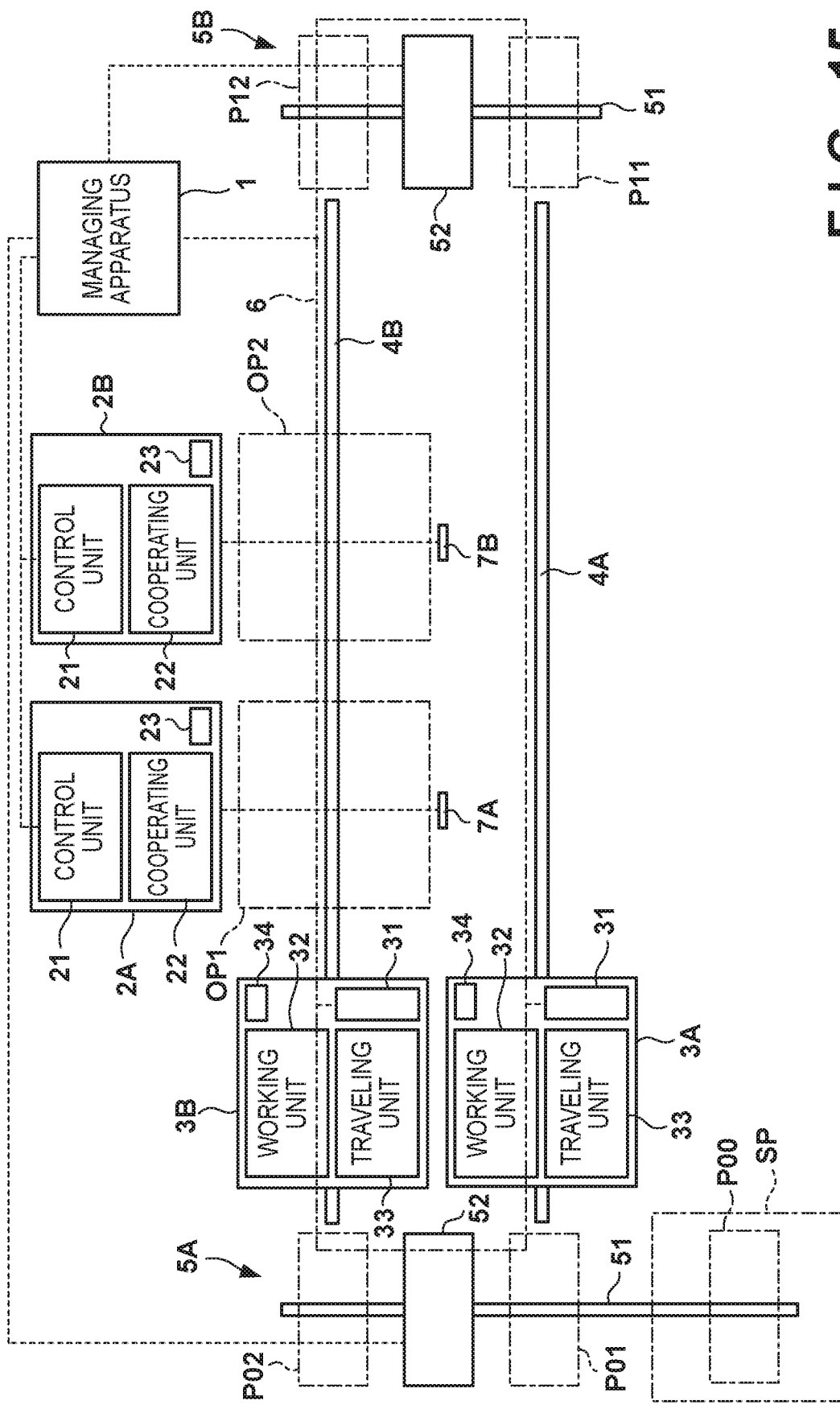
FIG. 15 is a view showing still another configuration example of the working system.

FIG. 15 shows an example including a plurality of stationary apparatuses and a plurality of movable apparatuses. In this example, two stationary apparatuses 2A and 2B are arranged, and corresponding working positions OP1 and OP2 are set. In addition, two movable apparatuses 3A and 3B are arranged. As explained in the example shown in FIG. 13, a cooperative work can be performed by moving the movable apparatuses 3A and 3B in the order of, for example, the working positions OP1 and OP2. A cooperative work may also be performed by moving the movable apparatus 3 to the same working position a plurality of times, for example, by moving the movable apparatus 3 in the order of the working positions OP1, OP2, and OP1. Furthermore, the working position can be changed from one movable apparatus 3 to another, in such a case in which a cooperative work is performed by moving the movable apparatus 3A to the working positions OP1 and OP2, whereas the movable apparatus 3B is moved to only the working position OP1. As explained in the example shown in FIG. 14, the diameters of the drum 322, the winding positions of the belt-like member V, and the like can be different between the working unit 32 of the movable apparatus 3A and the working unit 32 of the movable apparatus 3B. In these control operations, the processes explained in FIGS. 6 to 12 are properly applicable.

FIG. 16 shows an example including a plurality of movable apparatuses having different moving paths. In this example, movable apparatuses 3 and 3C are arranged. The movable apparatus 3 and its moving path are the same as those of the examples described above. The movable apparatus 3C is so configured as to move on a moving path different from that of the movable apparatus 3. In this example, the movable apparatus 3C can move back and forth in the direction of an arrow d2 on a straight moving path defined by a rail 8. This example includes trolleys 6A and 6B for communicating with the managing apparatus 1 and movable apparatuses 3 and 3C.

As shown in FIG. 16, working positions are positions where the stationary apparatus 2, movable apparatus 3, and movable apparatus 3C are aligned. The arrangement of the movable apparatus 3C is the same as that of the movable apparatus 3, but the servo driver 35 of the working unit 32 of the movable apparatus 3C includes two communication units 34A and 34B. The communication unit 34A is an optical communication unit facing the communication unit 23, and the servo driver 35 of the movable apparatus 3C and the control unit 21 of the stationary apparatus 2 communicate with each other via the communication units 23 and 34A. The communication unit 34B is an optical communication unit facing the communication unit 34 of the movable apparatus 3, and the servo driver 35 of the movable apparatus 3C and the servo driver 35 of the movable apparatus 3 communicate with each other via the communication units 34A and 23. In other words, the control unit 21 of the stationary apparatus 2 communicates with the servo driver 35 of the movable apparatus 3C and the servo driver 35 of the movable apparatus 3 via the communication units 23, 34A, 34B, and 34, thereby establishing a servo link.

The cooperating unit 22, the working unit 32 of the movable apparatus 3C, and the working unit 32 of the movable apparatus 3 can perform a specific work in cooperation with each other. For example, the cooperating unit 22 includes the drum 222, servo motor 221, and belt-type transmitting mechanism 223 shown in FIG. 2, the working unit 32 of the movable apparatus 3C includes the cutter unit 224, and the working unit 32 of the movable apparatus 3 includes the drum 322, servo motor 321, and belt-type transmitting mechanism 323.

The units may also be so configured as to be able to select a case in which the cooperating unit 22 and the working unit 32 of the movable apparatus 3C perform a cooperative work, and a case in which the cooperating unit 22 and the working unit 32 of the movable apparatus 3 perform a cooperative work. When the cooperating unit 22 and the working unit 32 of the movable apparatus 3 perform a cooperative work, the movable apparatus 3C is not positioned between them, and the control unit 21 of the stationary apparatus 2 communicates with the servo driver 35 of the movable apparatus 3 via the communication units 23 and 34, thereby establishing a servo link.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-040413, filed Mar. 2, 2016, which is hereby incorporated by reference herein in its entirety.

What is claimed is:

1. A control method of a working system, the working system comprising:
at least one movable apparatus movable on a predetermined moving path; and
at least one stationary apparatus arranged along the moving path,
the movable apparatus comprising a working unit configured to perform a predetermined work, and
the stationary apparatus comprises: a control unit configured to perform drive control of a servo driver of the working unit; and a cooperating unit configured to operate in cooperation with the working unit,
the working unit comprising a rotary driving mechanism configured to rotate a rotary body at a predetermined rotational speed, and the cooperating unit comprising a supply mechanism configured to supply a member to be wound around the rotary body to the working unit at a predetermined supply speed,
the control method comprising:
a detection step of detecting that the movable apparatus has reached a working position set on the moving path and corresponding to the stationary apparatus;
a communication instruction step of instructing, when it is detected in the detection step that the movable apparatus has reached the working position, the control unit of the stationary apparatus corresponding to the working position to establish a communication link of a servo system for the drive control with the servo driver of the working unit of the movable apparatus;
a first updating step of updating status information indicating a communication establishment status of the communication link of the servo system, after the communication instruction step;
a signal transmission instruction step of instructing the control unit to transmit an operation signal to the servo driver of the working unit which establishes the communication link of the servo system;
a disconnection instruction step of instructing the control unit to cancel the communication link of the servo system, after the signal transmission instruction step; and
a second updating step of updating the status information after the disconnection instruction step,
wherein the signal transmission step further comprises a step of transmitting an operation signal in the communication link of the servo system for a cooperative operation to the working unit and the cooperating unit, and
the control unit controls the rotational speed and the supply speed in the cooperative operation.

2. A control method according to claim 1, further comprising:
a working unit registration step of registering identification information of the working unit in the control unit; and
a working unit recognition step of causing the control unit to recognize the working unit in the working position based on the identification information of the working unit, wherein
the communication instruction step instructs the control unit to establish the communication link with the servo driver of the working unit which is recognized in the working unit recognition step.

3. A control method according to claim 1, wherein
the movable apparatus comprises a detection unit configured to detect a present position, and the control method further comprises:
a moving step of moving the movable apparatus to the working position; and
a moving position registration step of acquiring a detection result from the detection unit when the movable apparatus is arranged in the working position, and registering a position indicated by the detection result as a movement target position of the movable apparatus.

4. A control method according to claim 3, wherein in the moving step,
the detection result of the detection unit is acquired from the movable apparatus, and the movable apparatus is moved based on a present position of the movable apparatus indicated by the acquired detection result, and the movement target position.

5. A working system comprising:
at least one movable apparatus movable on a predetermined moving path;
at least one stationary apparatus arranged along the moving path; and
a managing apparatus configured to manage the movable apparatus and the stationary apparatus,
wherein the movable apparatus comprises a working unit configured to perform a predetermined work, the working unit comprising a rotary driving mechanism configured to rotate a rotary body at a predetermined rotational speed,
the stationary apparatus comprises: a control unit configured to perform drive control of a servo driver of the working unit; and a cooperating unit configured to operate in cooperation with the working unit, the cooperating unit comprising a supply mechanism configured to supply a member to be wound around the rotary body to the working unit at a predetermined supply speed,
the control unit and the working unit are able to communicate with each other, and
the managing apparatus performs:
a communication instruction of instructing, when it is detected that the movable apparatus has reached a working position set on the moving path and corresponding to the stationary apparatus, the control unit of the stationary apparatus corresponding to the working position to establish a communication link of a servo system for the drive control with the servo driver of the working unit of the movable apparatus;
a first update of updating status information indicating a communication establishment status of the communication link of the servo system, after the communication link of the servo system is established;
a signal transmission instruction of instructing the control unit to transmit an operation signal to the servo system of the working unit which establishes the communication link of the servo system;
a disconnection instruction of instructing the control unit to cancel the communication link of the servo system, after the operation signal is transmitted; and
a second update of updating the status information after the disconnection instruction,
wherein the signal transmission step further comprises a step of transmitting an operation signal in the communication link of the servo system for a cooperative operation to the working unit and the cooperating unit, and
the control unit controls the rotational speed and the supply speed in the cooperative operation.

6. A working system according to claim 5, wherein the managing apparatus further performs a third update of updating working unit registration information indicating a relationship between the working position and identification information of the working unit of the movable apparatus stopped in the working position.

7. A working system according to claim 5, wherein
the stationary apparatus comprises a first communication unit,
the movable apparatus comprises a second communication unit, and
the control unit and the working unit communicate with each other in the communication link of the servo system via the first communication unit and the second communication unit.

8. A working system according to claim 7, wherein the servo driver is a driving circuit of the working unit for the drive control and is connected to the second communication unit,
the servo driver has servo identification information, and
the control unit includes a storage unit which stores the servo identification information of the servo driver controlled by the control unit, and establishes the communication link of the servo system with the servo driver which communicates with the control unit.

9. A working system according to claim 7, wherein the first communication unit and the second communication unit are wireless communication units.

10. A manufacturing method of manufacturing a product by winding a member into a ring form by a manufacturing system, wherein
the manufacturing system comprises:
at least one movable apparatus movable on a predetermined moving path; and
at least one stationary apparatus arranged along the moving path;
the movable apparatus comprising a working unit including a driving mechanism configured to rotate a rotary body, and
the stationary apparatus comprising:
a supply mechanism configured to supply the member to the working unit; and
a control unit configured to perform drive control of the supply unit and a servo driver of the working unit,
the manufacturing method comprises:
a detection step of detecting that the movable apparatus has reached tG a working position set on the moving path and corresponding to the stationary apparatus;
a communication instruction step of instructing, when it is detected in the detection step that the movable apparatus has reached the working position, the control unit of the stationary apparatus corresponding to the working position to establish a communication link of a servo system for the drive control with the servo driver of the working unit of the movable apparatus;
a first updating step of updating status information indicating a communication establishment status of the communication link of the servo system, after the communication instruction step;
a signal transmission instruction step of instructing the control unit to transmit an operation signal to the servo driver of the working unit which establishes the communication link of the servo system;
a disconnection instruction step of instructing the control unit to cancel the communication link of the servo system, after the signal transmission instruction step; and a second updating step of updating the status information after the disconnection instruction step, and in the signal transmission instruction step, the control unit controls supply of the member by the supply mechanism, and controls winding of the member around the rotary body by the driving mechanism.

\* \* \* \* \*

UNITED STATES PATENT AND TRADEMARK OFFICE
CERTIFICATE OF CORRECTION

PATENT NO. : 10,775,764 B2
APPLICATION NO. : 15/442983
DATED : September 15, 2020
INVENTOR(S) : Hitoshi Shizuku and Nobuyuki Ono It is certified that error appears in the above-identified patent and that said Letters Patent is hereby corrected as shown below:

Column 20, Claim 10, Line 46, delete "tG".

Signed and Sealed this
Third Day of November, 2020

Andrei Iancu
*Director of the United States Patent and Trademark Office*